US008930458B2

(12) United States Patent
Lewis

(10) Patent No.: US 8,930,458 B2
(45) Date of Patent: Jan. 6, 2015

(54) GPS PATHFINDER CELL PHONE AND METHOD

(75) Inventor: Scott Lewis, West Palm Beach, FL (US)

(73) Assignee: Pathfinders International, LLC, West Palm Beach, FL (US)

( * ) Notice: Subject to any disclaimer, the term of this patent is extended or adjusted under 35 U.S.C. 154(b) by 129 days.

(21) Appl. No.: 13/536,618

(22) Filed: Jun. 28, 2012

(65) Prior Publication Data

US 2012/0315877 A1 Dec. 13, 2012

Related U.S. Application Data

(63) Continuation-in-part of application No. 13/524,724, filed on Jun. 15, 2012, which is a continuation-in-part of application No. 13/296,874, filed on Nov. 15, 2011, which is a continuation-in-part of application No. 12/410,003, filed on Mar. 24, 2009, now Pat. No. 8,154,440, which is a continuation-in-part of application No. 11/696,532, filed on Apr. 4, 2007, now abandoned.

(51) Int. Cl.
| G06F 15/16 | (2006.01) |
| H04W 4/00 | (2009.01) |
| G01S 19/17 | (2010.01) |
| G08B 21/02 | (2006.01) |
| G08B 27/00 | (2006.01) |
| H04W 4/08 | (2009.01) |
| H04W 12/02 | (2009.01) |

(52) U.S. Cl.
CPC ............... *H04W 4/001* (2013.01); *G01S 19/17* (2013.01); *G08B 21/0269* (2013.01); *G08B 27/001* (2013.01); *H04W 4/08* (2013.01); *H04W 12/02* (2013.01); *H04M 2242/04* (2013.01)
USPC .......................................... 709/204; 709/219

(58) Field of Classification Search
USPC .................................................. 709/219, 204
See application file for complete search history.

(56) References Cited

U.S. PATENT DOCUMENTS

| 4,786,008 A | 11/1988 | Corbett |
| 4,956,875 A | 9/1990 | Bernard et al. |

(Continued)

FOREIGN PATENT DOCUMENTS

EP 1903757 3/2008

OTHER PUBLICATIONS

Garlits, J., "New uses of social media and emergency technologies in emergency management", 14th Annual Federal Emergency Management Higher Education Conference, (Jun. 6-9, 2011).

(Continued)

*Primary Examiner* — Joseph E Avellino
*Assistant Examiner* — Marshall McLeod
(74) *Attorney, Agent, or Firm* — McHale & Slavin, P.A.

(57) ABSTRACT

A device and system for use before and after a disaster which incorporate a "Whole Community" response is illustrated. The system can be readily customized for use in other markets and scenarios and easily adapted into uses by emergency management. The device incorporates a GPS radio and/or cell phones with, pre-programmed instructions which are uploaded automatically in the device's memory via wireless technology prior to the unit's first use. Radios on the units can enable the searchers to audibly communicate with each other without cell towers. The system can be employed by cleanup teams, insurance adjusters, and any number of pre/post response teams focused on mitigation, preparedness, response, and recovery operations. The system can contain a modifiable and functional, virtual badge and can export data gathered in the field, as well as integrate this data with other, pre-existing software via software APIs contained within the system and cell phone software.

14 Claims, 21 Drawing Sheets

(56) References Cited

U.S. PATENT DOCUMENTS

| | | |
|---|---|---|
| 5,278,539 A | 1/1994 | Lauterbach et al. |
| 5,555,286 A | 9/1996 | Tendler |
| 5,592,408 A | 1/1997 | Keskin et al. |
| 5,619,412 A | 4/1997 | Hapka |
| 5,628,050 A | 5/1997 | McGraw et al. |
| 5,652,717 A | 7/1997 | Miller et al. |
| 5,724,255 A | 3/1998 | Smith et al. |
| 5,808,916 A | 9/1998 | Orr et al. |
| 5,815,417 A | 9/1998 | Orr et al. |
| 5,848,373 A | 12/1998 | DeLorme et al. |
| 5,914,675 A | 6/1999 | Tognazzini |
| 5,978,804 A | 11/1999 | Dietzman |
| 6,002,748 A | 12/1999 | Leichner |
| 6,023,223 A | 2/2000 | Baxter, Jr. |
| 6,028,514 A | 2/2000 | Lemelson et al. |
| 6,084,510 A | 7/2000 | Lemelson et al. |
| 6,133,854 A | 10/2000 | Yee et al. |
| 6,141,609 A | 10/2000 | Herdeg et al. |
| 6,151,611 A | 11/2000 | Siegel |
| 6,167,255 A | 12/2000 | Kennedy, III et al. |
| 6,199,045 B1 | 3/2001 | Giniger et al. |
| 6,268,798 B1 | 7/2001 | Dymek et al. |
| 6,273,771 B1 | 8/2001 | Buckley et al. |
| 6,285,281 B1 | 9/2001 | Gatto |
| 6,292,724 B1 | 9/2001 | Apsell et al. |
| 6,315,198 B1 | 11/2001 | Lenglart et al. |
| 6,360,172 B1 | 3/2002 | Burfeind et al. |
| 6,373,430 B1 | 4/2002 | Beason et al. |
| 6,394,356 B1 | 5/2002 | Zagami |
| 6,429,812 B1 | 8/2002 | Hoffberg |
| 6,542,825 B2 | 4/2003 | Jones et al. |
| 6,550,674 B1 | 4/2003 | Neumark |
| 6,574,561 B2 | 6/2003 | Alexander et al. |
| 6,590,529 B2 | 7/2003 | Schwoegler |
| 6,603,405 B2 | 8/2003 | Smith |
| 6,693,586 B1 | 2/2004 | Walters et al. |
| 6,765,528 B2 | 7/2004 | Tranchina et al. |
| 6,771,969 B1 | 8/2004 | Chinoy et al. |
| 6,842,774 B1 | 1/2005 | Piccioni |
| 6,865,476 B1 | 3/2005 | Jokerst et al. |
| 6,868,320 B1 | 3/2005 | Burch |
| 6,868,340 B2 | 3/2005 | Alexander et al. |
| 6,999,876 B2 | 2/2006 | Lambert et al. |
| 7,068,163 B2 | 6/2006 | Sari et al. |
| 7,142,900 B1 | 11/2006 | Straub |
| 7,143,130 B2 | 11/2006 | Lin |
| 7,631,805 B2 | 12/2009 | Larson et al. |
| 7,760,905 B2 | 7/2010 | Rhoads et al. |
| 7,778,802 B2 | 8/2010 | O'Flaherty et al. |
| 7,808,378 B2 | 10/2010 | Hayden |
| 7,822,816 B2 | 10/2010 | Payne |
| 8,073,461 B2 | 12/2011 | Altman et al. |
| 8,131,281 B1 | 3/2012 | Hildner et al. |
| 8,145,183 B2 | 3/2012 | Barbeau et al. |
| 8,154,440 B2 | 4/2012 | Lewis |
| 8,174,931 B2 | 5/2012 | Vartanian et al. |
| 2002/0042846 A1 | 4/2002 | Bottan et al. |
| 2002/0069312 A1 | 6/2002 | Jones |
| 2002/0077953 A1 | 6/2002 | Dutta |
| 2002/0152028 A1 | 10/2002 | Motoyama et al. |
| 2002/0173909 A1 | 11/2002 | Verbil |
| 2002/0188522 A1 | 12/2002 | McCall et al. |
| 2003/0080897 A1 | 5/2003 | Tranchina et al. |
| 2003/0090735 A1 | 5/2003 | Silverbrook et al. |
| 2004/0049345 A1 | 3/2004 | McDonough et al. |
| 2004/0097929 A1 | 5/2004 | Branch et al. |
| 2004/0225432 A1 | 11/2004 | Pilley et al. |
| 2005/0114015 A1 | 5/2005 | Motoyama et al. |
| 2005/0116858 A1 | 6/2005 | Odamura |
| 2005/0152028 A1 | 7/2005 | Mitzkus |
| 2005/0210131 A1 | 9/2005 | Motoyama et al. |
| 2005/0212701 A1 | 9/2005 | Nimmo |
| 2005/0253753 A1 | 11/2005 | Lalik et al. |
| 2005/0267707 A1 | 12/2005 | Mian et al. |
| 2005/0288854 A1 | 12/2005 | Kitajima |
| 2006/0030339 A1 | 2/2006 | Zhovnirovsky et al. |
| 2006/0030356 A1 | 2/2006 | Haub et al. |
| 2006/0079200 A1 | 4/2006 | Hirouchi et al. |
| 2006/0148423 A1 | 7/2006 | Sharpe |
| 2006/0168185 A1 | 7/2006 | McCall et al. |
| 2006/0241761 A1 | 10/2006 | Gately |
| 2007/0213737 A1 | 9/2007 | Schermerhorn et al. |
| 2008/0208962 A1 | 8/2008 | Kim et al. |
| 2008/0246652 A1 | 10/2008 | Lewis |
| 2009/0307333 A1* | 12/2009 | Welingkar et al. ............ 709/219 |
| 2010/0076968 A1 | 3/2010 | Boyns et al. |
| 2010/0210240 A1* | 8/2010 | Mahaffey et al. ............ 455/411 |
| 2011/0070898 A1 | 3/2011 | Sanjeev et al. |
| 2012/0130753 A1 | 5/2012 | Lewis |

OTHER PUBLICATIONS

Schaffhauser, D., "Student-invented mobile app could replace security access badges", Campus Technology, Internet Article: Http://www.campustechnology.com/Articles/2012/02/13/Student-invented-mobiel-app-could-replace-security-badges.aspx?=CTMOB, (Feb. 13, 2012).

Van Grove, J., "Turn your phone into an interactive 'Hello my name is' badge", Internet article: http://mashable.com/2011/03/09/contxts-interactive-badge/, (Mar. 9, 2011).

Anonymous, "The Motorola SB1 smart badge", Motorola Product Brochure, Retrieved from Internet May 2, 2014, http://www.motorolasolutions.com/web/business/products/Motorola_SB1/SB1-smart-badge-brochure-1212_final.pdf, (Dec. 2011).

\* cited by examiner

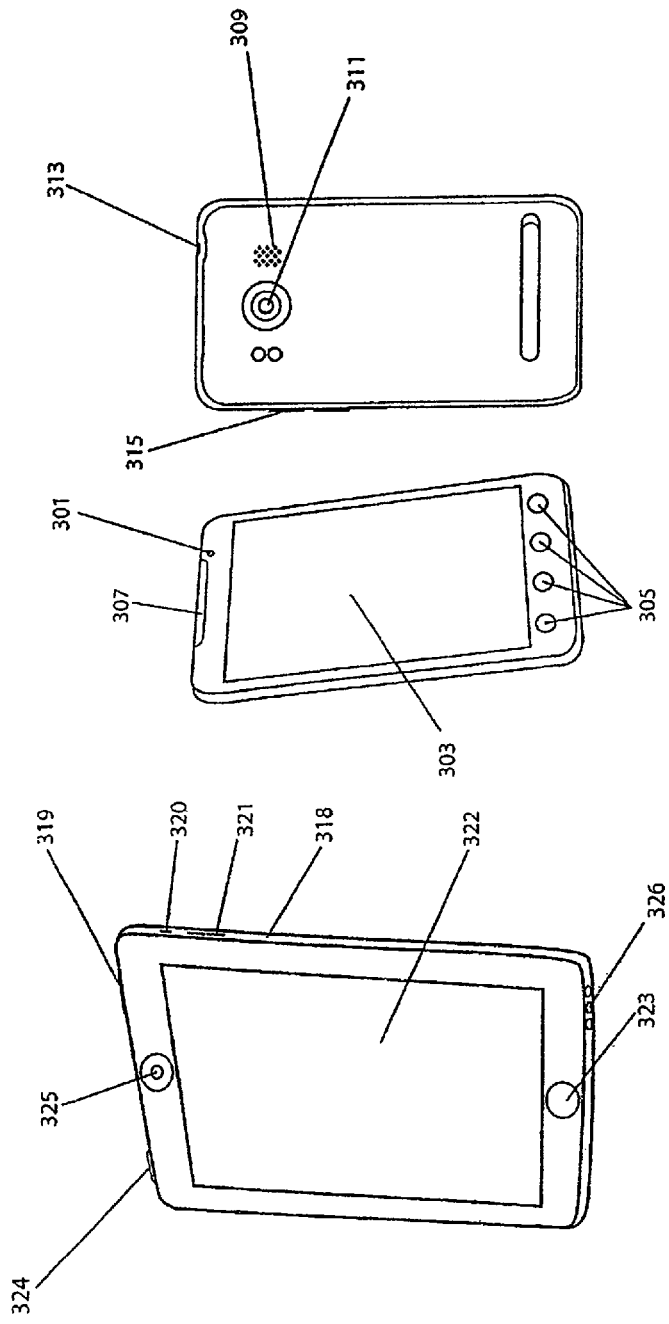

GPS PATHFINDER CELL PHONE AND METHOD

CROSS REFERENCE TO RELATED APPLICATIONS

This application is a continuation-in-part of U.S. patent application Ser. No. 13/524,724, filed Jun. 15, 2012, entitled, "GPS PATHFINDER CELL PHONE AND METHOD", which is a continuation-in-part of application U.S. patent application Ser. No. 13/296,874, filed Nov. 15, 2011, entitled, "GPS PATHFINDER CELL PHONE AND METHOD", which is a continuation-in-part of application U.S. patent application Ser. No. 12/410,003, filed Mar. 24, 2009, entitled "GPS PATHFINDER CELL PHONE AND METHOD", now U.S. Pat. No. 8,154,440, which is a continuation-in-part of application U.S. patent application Ser. No. 11/696,532, filed Apr. 4, 2007, entitled "GPS PATHFINDER METHOD AND DEVICE" and now abandoned; the entireties of these applications are incorporated herein by reference. Also related to these applications are the following Trademarks approved by the U.S. Patent Office: Pathfinders Task Force®, Pathfinders Eureka®, and GeoCrowd™.

FIELD OF THE INVENTION

The present invention relates to a system for a variety of operations before and after a disaster. The system is designed to be used by a wide variety of responders to methodically search for survivors in areas affected by disasters, collect rapid human needs assessments, property and critical infrastructure damage assessments, and identify and deliver unmet needs to the vulnerable populations. Field operations are precisely documented by geocoding and time/date stamps, as well as are retained within the system for future analysis. The entire system of the present invention has as its acronym PRAS (Pathfinders Rapid Assessment System).

The present invention also relates to a system of business workflow management designed to be used to monitor, track, and allow mobile workers to submit job updates to a private database that only authorized users can access, including geo-tagged photos (photos referenced by GPS coordinates). By providing administrators with the ability to send alerts and tasks to their users, as well as allowing users to send messages, notes, forms, and events to each other, the system is also able to be used to manage personnel, plus affiliated and spontaneous volunteers during both emergency and non-emergency situations and for general social networking purposes.

BACKGROUND OF THE INVENTION

The present invention relates to a disaster response and recovery system which incorporates a methodical approach to a variety of disaster operations. The system is designed so that individuals unfamiliar with the affected disaster areas can easily navigate these areas and readily record locations wherein specific assistance is required. The present invention relates to a cellular phone equipped with mobile software capacity, a Global Positioning System (GPS) receiver, GPS functions, and BLUETOOTH®, which system is designed to work when the cell towers are damaged or destroyed.

Until recently, with the ready access and low cost of GPS devices, it was very difficult and sometimes impossible to perform adequate disaster operations in areas that have been totally devastated by natural disasters such as hurricanes or earthquakes. Extremely large hurricanes, such as Katrina in Mississippi and Louisiana and Andrew in South Florida, have resulted in total destruction and devastation in the areas they have hit. After these two hurricanes there were no homes, buildings, street signs or other landmarks left standing so that an individual could pinpoint their location or indicate to other individuals where assistance was required. The flooding caused by Hurricane Katrina in New Orleans left the city and surrounding areas in the same condition, with no points of reference. Conventional maps become useless in these situations because they rely on points of reference at specific locations on the ground.

The recent developments in GPS have resulted in GPS devices that are small enough to be hand held. Improved location software and access to Wide Area Augmentation System (WAAS) have enabled the determination of the position of an object to within one meter or three feet of its actual location. These GPS devices do not require any landmarks or reference points to determine the location of an object. Thus, once the object's longitude and latitude have been recorded in the device, it is relative easy to return to the same location using these coordinates. The longitude and latitude of an object is known as its waypoint. Software has been developed which enables the generation of electronic maps from waypoints of known locations. These maps are the ones which are commonly used in the navigation systems found on many of today's automobiles. The location of the cursor representing the GPS unit on the navigation map is the result of real time, way point determination.

The recent developments in mobile technology have resulted in touchpad based and GPS capable cell phone computers known as "Smartphones" and "Tablets", which have advanced computing abilities. These devices, which primarily use Unix-based operating systems, allow for much simpler software application integration with the device hardware, such as the GPS receiver or BLUETOOTH® chip. This inherent property of modern mobile devices allows for much easier customization of software applications to be cross-platform and be compatible with a multitude of devices from a multitude of cellular carriers.

In addition to the growing popularity and demand for GPS navigational devices, portable two-way radios are once again enjoying widespread popularity. In 1996, the Federal Communications Commission (FCC) established the Family Radio Service (FRS) in order for families and other small groups to be able to communicate with one another over very small distances (usually less than two miles) at no charge and without the need for an FCC license. Another service is the General Mobile Radio Service (GMRS). This is a personal radio service available for the conduct of an individual's personal and family communications. It operates in the UHF frequency band. When combined with a repeater it can also be used for radio communications. Currently, there are a number of commercially available two-way radios which are designed for use with the FRS and the GMRS.

Recently the handheld GPS units have been combined with portable two-way radios which operate on the FRS and GMRS frequencies. These combination units enable small groups of individuals to be in the wilderness, amusement parks, sporting events, etc. while remaining in voice communication with each other.

Some of the problems associated with the currently available GPS/radio units include the operation of numerous controls and overly complex software designs, in addition to the radio controls, which must be operated to transmit location data between the units. In addition, most of the current units will only transmit their location data when the user of the units elects to do so. This can become a problem. For example, parents may want to monitor the location of their children in an amusement park, but can only do so if the children periodically transmit their location information back to their parents.

Another problem with these units is the lack of privacy. These units broadcast on the FRS which is an unlicensed, shared communication service, and communications from different persons are normally transmitted simultaneously causing interference. This is true in areas where these units are popular such as amusement parks, sporting events and concerts. Many FRS and GMRS radios incorporate continuous tone coded squelch systems (CTCSS) to suppress the unwanted conversations. However, CTCSS does not prevent someone without CTCSS or someone who has turned their CTCSS off to overhear unwanted conversations. These unauthorized individuals can utilize the information they overhear to determine someone else's location.

Recently cellular telephones, cell phones, and touch screen tablet computers have been provided with GPS hardware and some GPS software to enable the user of the cellular phone or tablet computer to locate themselves. Also, if the cellular phone is provided with the proper software, the cellular phone can be used for navigation. These GPS equipped cell phones have gained widespread popularity, and some cell phones now incorporate BLUETOOTH® capability as well. Many of these cell phones operate on the CDMA (Code Division Multiple Access), TDMA (Time Division Multiple Access), or GSM (Global System for Mobile communication) wireless network standard. Some cell phones also operate on the iDEN network, commonly used on the push to talk phones like those that Nextel/Sprint use. Some iDEN cell phones also have been designed to function without cellular towers in a limited range for voice transmission over line of site communications.

DESCRIPTION OF THE PRIOR ART

U.S. Pat. No. 8,073,461, issued to Altman et al., discloses a location sharing network manager process. The process is executed on a server computer coupled to a plurality of mobile communication devices over a wireless network. Each mobile device is a location-aware mobile communication device. The process determines the geographic location of a mobile communication device operated by a user within an area, displays a map representation of the area around the mobile communication device on a graphical user interface of the mobile communication device, and superimposes on the map the respective locations of one or more other trusted users of mobile communication devices coupled to the mobile communication device over the network. A journal creation and management component provides tools for users to create and store user-generated content in the form of an online journal. This user-generated content can be automatically tagged with location information provided by the location-aware mobile communication device. Such geo-tagged journal information can be shared with specific users in the network or utilized by users with specific interest in the location dimension of the journal content. The user-generated content can be provided in the form of text or graphic messages, pictures, audio/video clips, and the like.

U.S. Publication No. 2010/0076968, filed by Boyns et al., discloses implementations that relate to systems and methods for aggregating and presenting data related to geographic locations. Geotag data related to geographic locations and associated features or attributes can be collected to build a regional profile characterizing a set of locations within the region. Geotag data related to the constituent locations, such as user ratings or popularity ranks for restaurants, shops, parks, or other features, sites or attractions can be combined to generate a profile of characteristics of locations in the region. The platform can generate recommendations of locations to transmit to the user of a mobile device, based for instance on the location of the device in the region as reported by GPS or other location service and the regional profile. Geotag data can include audio data analyzed using region-specific terms, and user recommendations can be presented via dynamic menus based on regional profiles, user preferences or other criteria.

U.S. Pat. No. 8,174,931, issued to Vartanian et al., discloses an apparatus and method for providing indoor location, position, or tracking of a mobile computer using building information. The mobile computer determines the dimensions of a room in a building using a range finder in the mobile computer. The determined dimensions of the room are compared to the building information to locate, position, or track the mobile computer in the building.

U.S. Pat. No. 7,778,802, issued to O'Flaherty et al., discloses a system that utilizes wireless devices as guard tour checkpoint data collection and checkpoint data communication devices. The wireless devices have the capability of reading various types of checkpoints and communicating the collected checkpoint data with a computer via a cellular telephone communication system and either a land-based telephone network, the Internet or a cellular data communication device. Alternatively, a Wi-Fi network or the Wi-Fi network and the Internet can be used to communicate collected checkpoint data with the computer. The computer stores and processes the data according to guard tour expected performance parameters, such as rules, schedules, and exceptions, and then generates the necessary commands to produce exception notifications and reports at various types of peripheral equipment.

A publication by James D. Garlits, NEW USES OF SOCIAL MEDIA AND EMERGENCY TECHNOLOGIES IN EMERGENCY MANAGEMENT, 14$^{th}$ Annual Federal Emergency Management Higher Education Conference, Jun. 6-9, 2011, discloses the uses of Social Media in Emergency Management. The different social media like Facebook, You-Tube, Flikr, Twitter, and texting on a phone are discussed in how they are used in the management of responding to emergencies. These social media also enable the "public" to talk directly to the "public" without a third party. The uses of social media after disasters, such as a cyclone in Queensland Australia, a tornado, and hurricane Ike in 2008 are discussed. Also, the manner in which FEMA is using social media is discussed.

A prior art device which combines a handheld GPS receiver and a radio is disclosed in U.S. Pat. No. 7,142,900, issued to Straub. The unit includes a GPS receiver and a radio transceiver. The GPS receiver operates in conjunction with cartographic data which is downloadable from cartridges. This enables the user to download a map of the immediate vicinity and determine their current location with respect thereto. The radio is a two-way radio which operates on the Family Radio Services (FRS) portion of the Citizens Band Radio Services. The broadcast range of these radios is generally two miles or less and they are commonly used by family and friends to keep in touch with each other in areas such as amusement parks and other recreational areas. The unit also has GMRS capability. This unit also has a "polling" function. This function is performed when a pushbutton or other device is activated to transmit a radio request to the other GPS/radio units to indicate their locations. The other units will automatically transmit their locations to the unit that had made the request. These locations can then be displayed on the requesting unit's display and the user can readily determine the locations of the other members of their party. While this unit can download a given day's track to a base unit, it does not have BLUETOOTH® technology and therefore must be hard wired to the base unit to store its track. Further, the use of the unit is far too complicated for the common user without prior instructions. In addition, the user cannot associate a written description or code with a specific waypoint in the unit.

U.S. Pat. No. 6,268,798, issued to Dymek et al., discloses a locator system for firefighters which incorporates a GPS receiver and a memory. The firefighter activates the locator unit as he enters a building and the unit records his path through the building. Should he become disoriented or injured he can activate the memory in the unit and the unit will provide a reverse indication of the path that was traversed up to that point. By following these reverse directions, the firefighter is able to safely exit the building. The unit can also communicate with a home base and transmit the path traversed by the firefighter to the home base so it can be uploaded to another unit. This second unit is employed by a rescuer into the building and by retracing the path the lost or injured firefighter is located. While these units can download a path traversed by a user, they are not equipped to be uploaded with a path to follow or an area to search. Further, they cannot associate a specific written condition or code with a waypoint.

U.S. Pat. No. 5,619,412, issued to Hapka, discloses a remotely accessible engine on a vehicle. Control of the engine can be performed on the vehicle, by the vehicle operator, or from a remote location via satellite communications.

U.S. Pat. No. 6,292,724, issued to Apsell et al., discloses a system for monitoring the location, status, utilization and conditions of a widely geographically dispersed fleet of vehicles utilizing satellite positioning and communications and the Internet. The data obtained from the vehicles can be displayed at numerous locations.

U.S. Published Patent Application No. 2003/0080897, filed by Tranchina et al., discloses a combination GPS receiver and radio. The GPS receiver operates in conjunction with a memory to enable a user to retrace the path they had just traversed. This feature enables a user to return to their starting point without getting lost. The radio operates on the General Mobile Radio Service (GMRS) or Family Radio Service (FRS) portion of the Citizens Band Radio channels. The broadcast range of these radios is generally two miles or less. While these units can download a path traversed by a user, they are not equipped to be uploaded with a specific path to follow or an area to search. In addition they cannot associate a written description or code with a specific way point.

U.S. Pat. No. 6,574,561, issued to Alexander et al., discloses a system for automating the gathering of field information which describes the condition of specific locations at specific times utilizing a field information recording device which has a GPSW receiver for recording and assignment of the space-time coordinates as information is gathered.

U.S. Pat. No. 6,868,340, issued to Alexander et al., also discloses a system for automating the gathering of field information which describes the condition of specific locations at specific times utilizing a field information recording device which has a GPSW receiver for recording and assignment of the space-time coordinates as information is gathered. The information and space-time coordinates are transmitted to a management center for processing.

U.S. Pat. No. 6,999,876, issued to Lambert et al., discloses a system for providing centralized deployment and coordination of field assessment activities. An emergency management data processing system includes a field assessment database for storing and processing layered geospacial visual portrayal data and field surveillance attribute data.

U.S. Pat. No. 7,822,816, issued to Payne, discloses a method and system for the management of data collected from a remote computer. The method includes creating a questionnaire, transmitting the questionnaire to a remote computer, executing the questionnaire in the remote computer to prompt a user for responses to questions of the questionnaire, transmitting the responses to a server via a network, and making the responses available on the Web. The computers utilized in this system are loosely networked, in that the network connections between the computers are not always available and when a connection is not available, data is stored at a node of the network and transmitted at the earliest time when a connection is available.

Therefore, what is needed in the art is a portable cellular phone which has GPS capabilities as well as BLUETOOTH®, and which can be uploaded with a map of an area to be searched after a disaster has occurred, and a method of recording the portions of the operation's area that the user will traverse during a given mission and track what has been searched over a given mission. Also, the portable unit should be capable of wirelessly downloading to a base unit the portions of the search areas that have not been covered during the day. Given the number of the units being used after an incident, hard wiring for uploads and downloads is not practical and is far too time consuming, but may be utilized as an additional transfer option. The unit should also enable the user to input specific information and/or recovery needs without complicated commands, all of which needs to be downloaded rapidly to a base unit for efficiency of the operations. Finally and most importantly, the cell phone must be able to do all of these functions with and without any Internet or any cell towers functioning.

SUMMARY OF THE INVENTION

The present invention is a device and system for use in the various stages of operations before and after a disaster. Due to the customizable nature of the software described herein, the present invention is a device and system for use in non-disaster purposes as well, including but not limited to: business management applications, user-to-user and user-to-business social networking, planned or spontaneous volunteer management, and rapid marketing intelligence gathering. The device incorporates a cell phone provided with GPS which can operate on CDMA, GSM, TDMA and/or iDEN (push to talk) networks. Maps of areas to be searched are uploaded into the device and the areas covered during the search are retained in the device's memory. A unique feature enables the cell phone user to quickly indicate a specific need or service at a particular location during the search via the cell phone software application. Areas that have been covered during a day are downloaded to a base unit, and areas to be covered the following day are uploaded to the portable units at the beginning of the next day—all via wireless technology. The software employed on the cell phones is designed to permit the cell phone to automatically or manually download the information stored as data to a laptop "server" or other device which functions as a "server", including datacenter based servers ("cloud" servers) when the cell phone is within BLUETOOTH® communication range of the server computer or when the cell phone has cellular or wireless service. Likewise, customization of the forms on the cell phone can also be made via cellular or wireless service or by BLUETOOTH® communication from a server and/or a laptop "server". Thus, the cell phones are "talking" or communicating directly to the laptop "servers" without the use of cell towers or the Internet, which in a totally disconnected environment is the setting or situation confronting responders in a major disaster. All of this is accomplished employing wireless technology. Push to talk radios on units also would enable the searchers to audibly communicate with each other. This system relies upon common software designs which can incorporate elements of Unix, Windows, Java, and other technologies programmed into this application to allow the cell phones to optimize their effectiveness, as well as cell phone operating systems included but not limited to: Apple's iOS and variants, Google's Android and variants, RIM's BLACKBERRY® OS, and Windows Mobile OS.

Accordingly, it is an objective of the instant invention to provide a cell phone equipped with GPS and which has software to enable GPS functions with BLUETOOTH® to enable a responder or other individual to navigate and search a specific area after landmarks and other reference points have been eliminated or destroyed.

It is a further objective of the instant invention to provide a cell phone equipped with GPS and having CGPS functions with BLUETOOTH® that records the operation's areas covered by a responder or individual during a day or other period of time. The tracks can be overlaid on to other units' tracks in the base station.

It is yet another objective of the instant invention to provide a cell phone provided with GPS and having GPS functions with BLUETOOTH® that downloads areas not covered during a search to a base unit and receives uploads of different areas to be searched the next day or time period via wireless technology.

It is a still further objective of the invention to provide a cell phone equipped with GPS and having GPS functions with BLUETOOTH® to have audible communication with other responders or individuals.

It is yet a further objective of the instant invention to provide a cell phone equipped with GPS and having GPS functions with BLUETOOTH® which can indicate the locations of other similar devices without input from the operators of the other devices. Real time tracking is thus achieved as well.

It is yet a further objective of the invention to provide a cell phone equipped with GPS and having GPS functions with BLUETOOTH® which can automatically download data stored on the cell phone to a computer which acts as a "server" when the cell phone is within BLUETOOTH® communication range of the "server". Any type of computer, including a laptop, can function as a "server". Therefore, the cell phones are "talking" directly to the "server" computers without the use of cell towers or use of the Internet. This would be the type of situation that exists when a disaster has occurred.

It is yet a further objective of the invention to provide cell phones equipped with GPS and having GPS functions with BLUETOOTH® which can communicate with each other and also with a base station. Data can be transferred between cells phones and also between the cell phones and the base station.

It is yet a further objective of the invention to provide a functional and efficient database to serve as the repository for all information gathered in the field via a cell phone equipped with GPS and having GPS functions with BLUETOOTH®.

It is yet a further objective of the invention to provide the means for an authorized and affiliated Governmental entity (typically a County or Parish's Emergency Management Team) to control a disaster response operation via the cell phone equipped with GPS and having GPS functions with BLUETOOTH®, which is interfaced with a web-based version of the cell phone software meant for administrative purposes.

It is yet a further objective of the invention to allow users to create discrete groups, businesses, organizations, and affiliations via a cell phone equipped with GPS and having GPS functions with BLUETOOTH® technology for the purpose of business management and user privacy.

It is yet a further objective of the invention to provide an easy to view interface via a cell phone equipped with GPS and having GPS functions with BLUETOOTH® technology to easily convey and display pertinent field-gathered information both on the phone and on the web.

It is yet a further objective of the invention to provide customization tools via a cell phone equipped with GPS and having GPS functions with BLUETOOTH® technology, such that responders and users in the field can utilize a "Form Creator" in the phone or on the web to customize and standardize the type of information they collect.

It is yet a further objective of the invention to provide organization tools via a cell phone equipped with GPS and having GPS functions with BLUETOOTH® technology, such that responders and users in the field can customize the organization of their workers and users into team or groups as desired by an administrator.

It is yet a further objective of the invention to provide inventory management related tools via a cell phone equipped with GPS and having GPS functions with BLUETOOTH® technology, such that responders and users in the field can easily create and maintain inventory lists for further reference.

It is yet a further objective of the invention to provide tools for mobile independent contractors to find jobs while in the field via a cell phone equipped with GPS and having GPS functions with BLUETOOTH® technology, such that potential employers may list jobs on a map (via the customized cell phone software) and be contacted by potential independent contractors to complete the jobs.

It is yet a further objective of the invention to provide a mobile credit card payment system and credit card payment gateway for mobile users to process payment via a cell phone equipped with GPS and having GPS functions with BLUETOOTH® technology, for jobs or purchases completed in the field.

It is yet a further objective of the invention to provide privacy controls via a cell phone equipped with GPS and having GPS functions with BLUETOOTH® technology for the purpose of allowing users in non-disaster purposes the ability to "hide" their location (and information submitted) from other discrete users, groups, businesses, organizations, or affiliations.

It is yet a further objective of the invention to provide the user with tools for integration with existing software (via software APIs) such that the data collected via a cell phone software system may be exported and integrated for additional disaster response uses, reporting, analytical, or business development purposes.

It is yet a further objective of the invention to enable 2-way satellite communication via cell phones and satellite devices that transmit data through the satellite network as opposed to through cellular signal.

Other objects and advantages of this invention will become apparent from the following description taken in conjunction with any accompanying drawings wherein are set forth, by way of illustration and example, certain embodiments of this invention. Any drawings contained herein constitute a part of

BRIEF DESCRIPTION OF THE FIGURES

FIGS. 7A-C are perspective views of a "Smartphone" and "Tablet" with GPS and GPS function with BLUETOOTH® according to a preferred embodiment of the present invention;

DETAILED DESCRIPTION OF THE INVENTION

Figure 1:
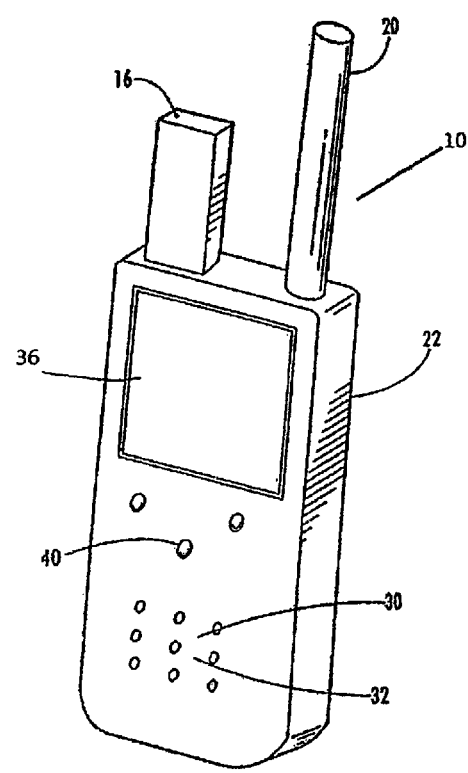
FIG. 1 is a perspective view of a combined GPS/radio device according to a preferred embodiment of the present invention.

While the present invention is a susceptible embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Figure 2B:
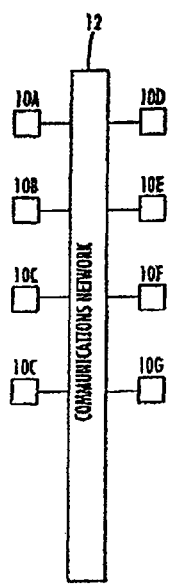
FIG. 2B is a block diagram of a communications network linking the GPS/radio unit of FIG. 1 with a plurality of other GPS/radio units.

A portable GPS receiver is combined with a radio transceiver into one unit 10 in a preferred embodiment of the present invention as illustrated in FIG. 1. A plurality of other similar GPS/radio units 10A-10G communicate with each other utilizing a communications network 12, as illustrated in FIG. 2B. The GPS/radio units 10A-10G determine their various locations utilizing GPS, and can then transmit these locations to the other units over a wireless network. In this manner, the locations of all the units can be determined and monitored by any one of the units. The preferred embodiment of the present invention is also provided with a radio. The units can also communicate with each other over a public radio network such as FRS, GMRS or iDEN.

Figure 2A:
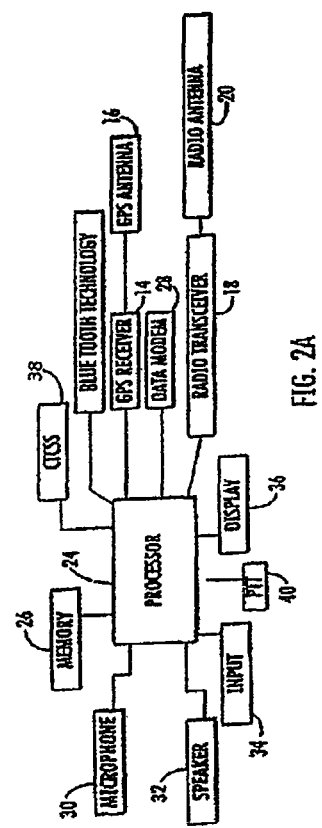
FIG. 2A is a block diagram of the components of the GPS/radio of FIG. 1.

Referring to FIGS. 1 and 2A the GPS/radio of the present invention will now be described. The GPS/radio unit 10 includes a GPS receiver 14, a GPS antenna 16, a radio transceiver 18 and an antenna 20 all mounted in or on the GPS/radio housing 22. The GPS receiver is electronically coupled to processor 24 which in turn is electronically coupled to a memory 26. The memory 26 can be built into the unit 10 or removably connected thereto, such as a flash memory stick or removable cartridge (both not shown). The memory will normally contain the information necessary to operate the unit 10. The memory can also be used to store cartographic data (electronic maps), waypoints or locations which the unit's operator wants to save, waypoints of the other units and other data which may be input into the unit 10. The radio transceiver 18 is electronically coupled to the processor 24 and a data modem 28. The data modem is utilized for transmitting and receiving data such as location data of the units.

The electronic maps stored on the removable memory devices can be readily displayed on the unit's display 36. Waypoints or areas traversed by the unit and stored in the memory can also be displayed on the display 36. In a preferred embodiment, the display 36 is a liquid crystal display (LCD) and is used to display other information in addition to navigational information. Any other type of display may also be used. The unit 10 also includes a microphone 30, a speaker 32 and an input 34. The microphone 30 and speaker 32 are conventional and can be the same type of microphone and speaker used on a conventional FRS or GMRS radio.

Input 34, in a preferred embodiment, is an alphanumeric keypad such as the keypad used on telephones. This permits the entry of letters, numbers and any other symbols found on keypads. Utilizing special software, almost any number, letter or symbol can be entered into the unit. This type of software is commonly available on cellular telephones. The input 34 could also be a microphone, a voice recognition input, a touch screen, a full keyboard similar to a BLACKBERRY® or a menu driven display screen.

The GPS/radio unit also could include a continuous tone coded squelch system (CTCSS) 38 and a push-to-talk button 40. The CTCSS controls the audio output of the speaker so that only a desired transmission can be heard by the user of the unit 10. The push-to-talk button 40 can be any conventional pushbutton switch or control device normally found on short range two-way radios. The push-to-talk button 40 is coupled with the processor 24 to combine two important functions in a single button. The push-to-talk button 40 is operable to both initiate transmission of voice communications and transmission of a radio signal which indicates the GPS location of the unit. Additionally, this feature permits updated location information to be automatically transmitted each time the user transmits a voice transmission.

Activation of the push-to-talk button can also trigger a transmission of a radio signal including GPS derived location data indicating the location of the unit transmitting the radio signal. This transmission occurs normally shortly after the voice communications are complete and the push-to-talk button has been released. The processor 24 keeps the radio transceiver enabled for approximately 100-300 milliseconds to allow the transmission of the location data. The GPS/radio unit 10 can also include another feature which enables other individuals to determine its location. This is a "polling" feature wherein one unit 10 sends a request to the other unit's 10A-10G for them to transmit their locations back to the requesting unit. This request can be performed manually by the operator of the requesting unit 10 or the requesting unit can be programmed to perform this operation automatically at pre-selected time intervals. The locations of the other units 10A-10G are updated on the electronic map of the requesting unit so that at any time all the units can know where all the other units are. Any and all of the units can perform this location request. If the units are programmed to perform this automatically, then no input is required by any of the operators.

Another optional feature of the GPS/radio unit and/or cell phone is a coding or encryption system. This system can employ any of the known coding or encryption schemes such as public or private key encryption methods. To employ this feature, a group of GPS/radio users would enter an agreed upon code into their units prior to use. The code would then encrypt the transmitted location data and the receiving units would be able to decrypt this information. This prevents other, unauthorized units from tracking the location of other units. This can be useful with groups such as law enforcement individuals.

GPS/radio units which include all of these features are complicated to operate, and numerous intricate operational procedures must be memorized and/or deciphered to obtain the desired results. Many individuals who are involved in search operations after disasters, such as hurricanes, are ordinary individuals who are not familiar with the operation of these GPS/radio units. Therefore, for the search missions to be successful, these units need to be modified so that anyone could readily operate them.

The first modification is a modification of the hardware. This modification involves equipping the units with a BLUETOOTH® communication system. This communication system enables the rapid transfer of large amounts of data wirelessly between devices within a close proximity (10-20 feet). This wireless communication system enables software modifications of the GPS/radio unit, which in turn enable uncomplicated operation of the unit, and transmission of data between the portable GPS/radio unit and a base station when there is no cellular of wireless connectivity.

Using, as an example, a Garmin Rhino 500 series GPS/radio, the following modifications to the software in the unit are made prior to its use in the search operations. Once these modifications have been made they do not need to be changed until the units are returned to normal service. These modifications can be made utilizing BLUETOOTH® communications from a base station.

First the GPS/radio unit is uploaded with the following information: User name. User symbol. GMRS channels to be used—one national emergency frequency. FRS channels to be used. CTCSS code for each team. CTCSS code for the task force. A list of radio frequencies to scan which only include those listed above.

Next, the radio is set up with the following parameters: Sending location. Permit polling function. GMRS power level. Scramble codes. Repeater channels. Headset type—BLUETOOTH® enabled. VOX level. Microphone sensitivity.

Next, the following tones are selected and activated: Call tone. Roger tone. Ring tone. Vibrate. Message beep. Key beep. Power beep. Turn warning.

Next, the new contact page overview data is provided: Only the team members plus the base station. Identify the Team Leader's unit.

Next, the main page functions are set: A position icon for the base unit is selected.

Next, a position icon for the team leader is selected. A position icon for the team members is selected. A single county map is entered into the unit. The pan map feature is turned off. The navigate function is turned on. The recalculate feature is turned off. The data fields are turned off. The guidance text is turned off. The set up map is pre-set. The measure distance feature is turned off. The declutter feature is turned on.

Next, the data fields are completed: The options are pre-programmed. The guidance text is turned off. The map is set up. In the general set up, North is selected as up. In the track set up, the scale is selected. In the map points, the scale is selected. The Text is set up. The map information is entered. The measure distance feature is deleted. The compass is deleted.

Next, the main page is changed: The satellite page is deleted. The trip computer page is deleted. The mark waypoints feature is turned on. Each waypoint name has an Emergency Support Function (ESF) associated with it. There is also a 1-2 word descriptor for each waypoint. The find menu is restricted to waypoints, the base and team contacts. The track page is only for the team. The routes page is only for the team. The highway page is deleted. The proximity page is deleted. The calendar is deleted. The alarm clock is deleted. The calculator is deleted. The stop watch is deleted. The sun and moon feature is deleted. The hunt and fish feature is deleted. The games are deleted.

Next, the Tracks page is: Pre-programmed daily. The back track is pre-programmed. The track log is pre-programmed.

Next, on the Routes page: Certain waypoints are pre-programmed. The page is cleared daily after being downloaded. The routing methods are pre-programmed. Navigating a route is set only to a day by day target area. The highway page is deleted.

Next, the Setup page is pre-programmed to the above settings.

Next, the Display setup page is pre-programmed as follows: The display mode is selected. The color scheme is selected. The backlighting time is chosen. The backlight intensity is chosen.

Next, the unit's set up page is deleted.

Next, the LORAN TD format is deleted.

Next, the Heading setup page is pre-programmed.

Next, the Welcome setup page is pre-programmed.

Next, the interface setup page is pre-programmed.

Finally, the proximity waypoints are deleted.

After these modifications have been performed, the team members go out into the designated search areas with their portable hand held GPS/radio units. At the beginning of every day a different route or search area is programmed into each unit, as well as different forms or work orders. Preferably each team will have the same route or search area and different teams will have different routes or search areas. As the team members cover the routes or search areas they will encounter individuals or locations which require specific needs. Various services to respond to these needs in disasters have been designated as Emergency Support Functions (ESF) and categorized with possible uses as follows (noting these ESF descriptions listed can vary state by state):

ESF #1: Transportation: Monitoring assets and equipment, transportation safety, movement restrictions and damage impact and assessment.

ESF #2: Communications: Supplement existing systems without overwhelming capacity given a large scale operation.

ESF #3: Public Works and Engineering: Locating infrastructure protection and emergency repair, including roads, bridges, potable water, sanitation, utility grid emergency needs.

ESF #4: Firefighting: First responder's monitoring and coordination for incoming, out of region, fire rescue services following any disaster.

ESF #5: Emergency Management: Coordination and command resources, monitor and assign assets, and incident action planning.

ESF #6: Mass Care, Housing and Human Services: Follow up specialty resources as identified by first response teams with software waypoint system.

ESF #7: Resource Support: Logistics location, monitoring, dispatch and distribution, with emphasis on personnel from out of the area response teams within a given disaster zone.

ESF #8: Public Health and Medical Services: Logistics location including pharmaceutical supplies and medical personnel management; D-Mort service teams' and EMS personnel locations and assignments and precise locations.

ESF #9: Urban Search and Rescue: Accurate resource management and detailed tracking and mapping for 100% coverage of the affected area without costly re-searching areas previously covered.

ESF #10: Hazardous Materials: Locate and identify the precise location of various threats. Monitor and mitigate the needs to suppress these threats and prioritize the threats.

ESF #11: Food, Water and Natural Resources: Locate sources for mass food and water resources by sector. Food safety and security; locate historic properties protection and nutrition assistance.

ESF #12: Energy: Coordinate, dispatch, monitor and locate emergency energy needs and response units.

ESF #13: Military Affairs: Public safety and security— incoming units can be universally tracked and monitored for efficient management, including using military personnel for various other ESF function needs as required, including traffic management operations.

ESF #14: Public Information: Locates informational needs by street address and available resource allocation distributions.

ESF #15: Volunteers: Volunteer management of incoming personnel and resources to be distributed across ESF functions as needed using locator source system.

ESF #16: Law Enforcement: Coordinate the mobilization of law enforcement and security resources.

ESF #17: Animal Protection: Provide rescue, protective care and feeding for animals using GPS locator assistance.

ESF #18: Business and Industry and Economic Stabilization: Coordinate the response of State agencies in assisting local economic redevelopment via locator source system.

In addition to associating an ESF number with a waypoint, wherein a particular need or service has been identified by the searcher, a 1-2 word descriptor can also be associated with the waypoint. This would help to clarify any ambiguities that a third party may have regarding a particular waypoint and emergency service that was associated with the waypoint. These descriptors could also be used to identify a particular need or resource that would be required at a particular area or site.

Figure 3:
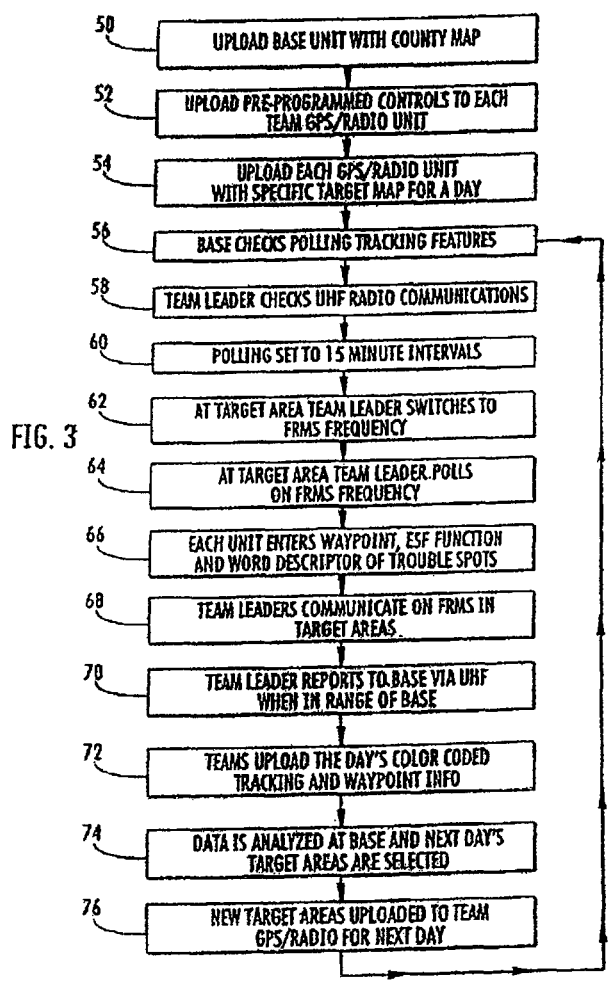
FIG. 3 is a flow diagram of the procedure utilized by the search and response teams.

With reference to FIG. 3, the operation of a typical search would proceed as follows. The base unit is uploaded with a map of the county or area surrounding the site of the disaster at 50. The individual team GPS/radio and/or cell phone units are uploaded with pre-programmed controls and settings at 52. The individual team units are uploaded with a specific target search map for one day at 54. The base unit checks the polling tracking features of the units at 56. The team leader checks the radio communications between his unit, the team members units and the base station at 58. These radio communications can be in UHF, VHF or 800 MHz frequencies as well as the IDENT network. The polling feature of the field units is set for 15 minute intervals at 60. After the teams reach the target or search area, they switch their radios to operate on the FRS radio frequency at 62 or rely upon the iDEN system. The team leader polls the team members on the FRS frequency or iDEN during the searching operations at 64. Whenever they reach a trouble spot the team members enter a waypoint, ESF number and descriptor into their individual units at 66. The team leaders communicate with each other over the FRS frequency or iDEN while in the search area at 68. The team leader reports in to the base station over the UHF, VHF or 800 MHz frequencies or iDEN when they are within range of the base station at 70. The team members upload the routes covered, searched areas and waypoints from that day to the base station at 72. While the upload is preferably preformed wirelessly, any other type of data transfer is acceptable. These routes or search areas may be color coded. The data uploaded into the base station unit is analyzed and the next day's search areas or route are determined at 74. The new search areas or routes are uploaded into the teams' individual GPS/radio units at 76 and the procedure then returns to step 56. While the new routes are preferably uploaded wirelessly, any other type of data transfer is acceptable.

Figure 4:
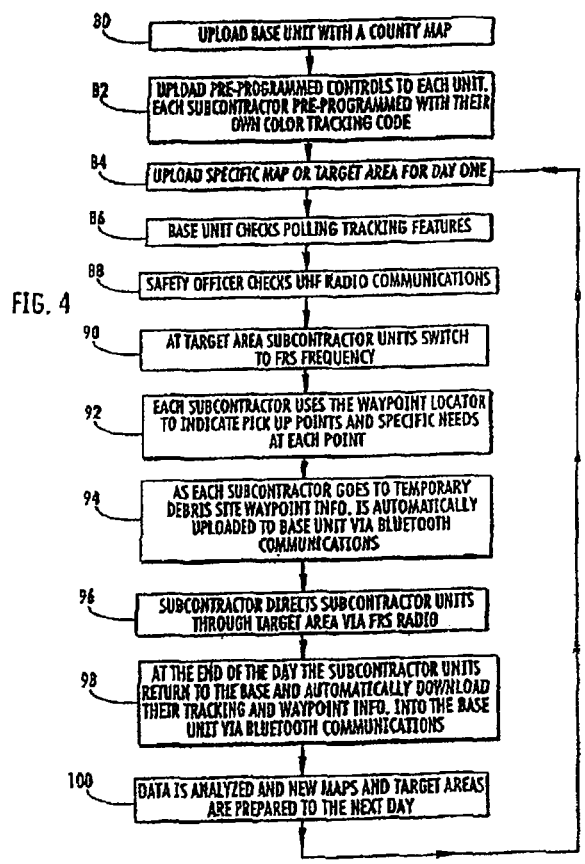
FIG. 4 is a flow diagram of the procedure utilized by a cleanup contractor.

With reference to FIG. 4, the procedure of a typical cleanup operation after a disaster is described. The base unit is uploaded with a map of the county or area surrounding the site of the disaster at 80. The subcontractors' units are pre-programmed with controls, settings and color codes at 82. The subcontractors' units are uploaded with a specific maps, target areas, forms and notes for the day at 84. The base unit checks the polling tracking feature of the individual units at 86 prior to dispatching the subcontractors. The safety officer checks the UHF, VHF or 800 MHz frequency or iDEN communications feature of the individual units at 88 which are GPS/radio and/or cell phone units. Once within the target area, the subcontractors' units are switched to operate on the FRS radio frequency or iDEN at 90. Each subcontractor uses the waypoint locator to indicate a pickup site and the specific needs at each site at 92. The subcontractors proceed to a temporary debris site within the target area. At this location the waypoint information which they have collected that day is downloaded to a unit at the temporary debris site via BLUETOOTH® communications at 94. This information is subsequently sent to a base station through the best methodology available during that moment in time, included but not limited to wireless or cellular data transfer as well as BLUETOOTH® technology. The subcontractor continues to direct the subcontractor units through the target area via FRS radio or IDEN at 96. At the end of the day the subcontractor units return to the base station and automatically download their tracking and waypoint information to a base station unit via BLUETOOTH® communications at 98. The data is analyzed and new maps, target areas, forms and notes are prepared for the next day's operation at 100 and the procedure then returns to step 84.

Figure 5:
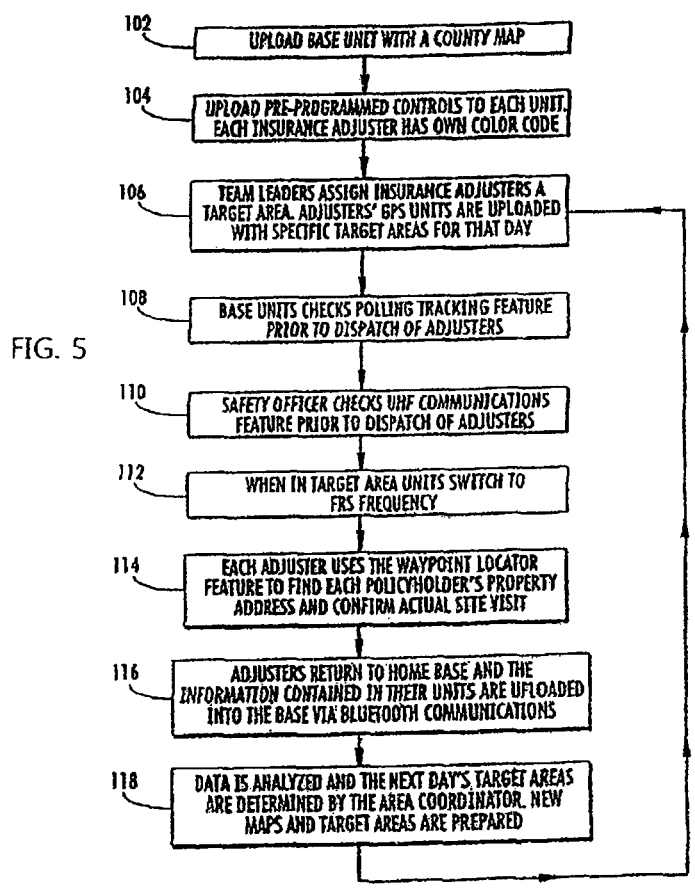
FIG. 5 is a flow diagram of the procedure utilized by insurance company adjusters.

With reference to FIG. 5, the operation of a typical insurance company's adjuster's visit to a disaster area is described. The base station unit is uploaded with a map of the county or area surrounding the site of the disaster at 102. The individual insurance adjusters' GPS/radio and/or cell phone units are uploaded with pre-programmed controls, settings and color codes at 104. The team leaders assign the insurance adjusters a target area, and the adjusters' GPS/radio units are uploaded with the specific target areas to be covered that day at 106. The base station unit checks the polling tracking feature of the adjusters' units at 108, prior to dispatching the adjusters. The safety officer checks the UHF, VHF or 800 MHz frequency radio or iDEN communications between the GPS/radio units at 110. After the insurance adjusters have entered the target area, they switch their radios to operate on the FRS radio frequencies or iDEN at 112. Each insurance adjuster uses the waypoint locater feature of their GPS/radio unit to locate each policyholder's property address and confirm the actual visit to the site at 114. The adjuster can then make notes regarding damages to the property in their own computers or other devices. The insurance adjusters return to the base station and the information contained in their units is uploaded into the base station unit via BLUETOOTH® communications at 116. The data is analyzed and the following day's target areas are determined by the insurance coordinator. New maps and target areas are prepared for the following day at 118 and the procedure then returns to step 106.

In addition to the users listed above, this system can be employed by any and all members of a first responder services such as Homeland Security, the military, the National Guard, Hazardous Material teams, non-governmental responders, volunteer groups, long term recovery organizations, public works department personnel, private sector responders, all other ESF personnel, and the Emergency Management Assistance Compact (EMAC). These individuals and associations will normally use the present invention to assist in the recovery, assistance, and cleanup after natural disasters such as hurricanes, tornadoes, floods and snow storms. However, the present invention can be used for any situation wherein a number of people require assistance like fires, power blackouts, etc., or just as a networking system.

Figure 6:
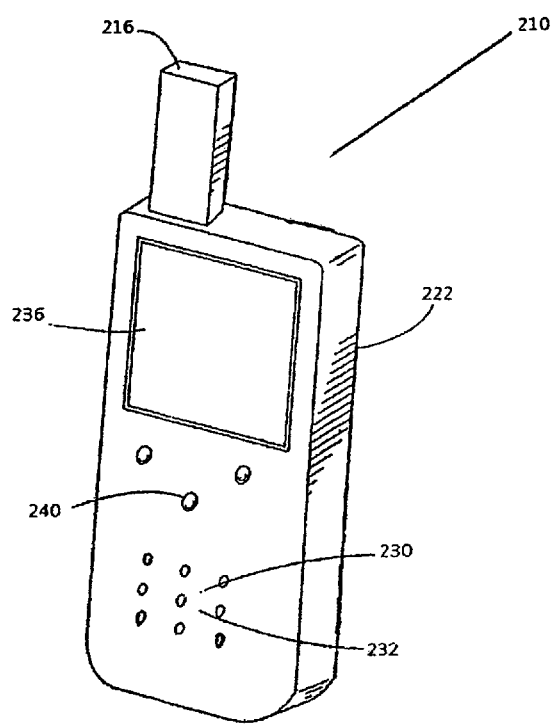
FIG. 6 is a perspective view of a cell phone with GPS and GPS functions with BLUETOOTH® according to a preferred embodiment of the present invention.
Figure 8B:
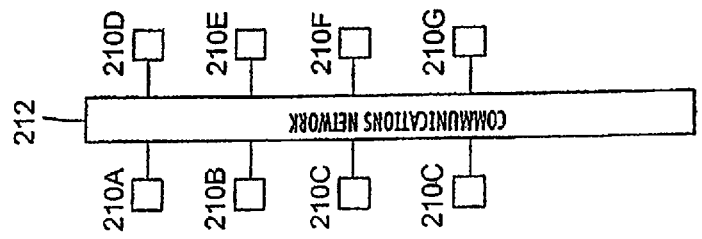
FIG. 8B is a block diagram of a communications network linking the cell phone of FIG. 6 with a plurality of other cell phones.

A portable cell phone equipped with GPS and GPS functions/capabilities as well as BLUETOOTH® is illustrated in FIG. 6 as 210 as a preferred embodiment of the present invention. A plurality of other similar cell phones 210A-210G communicate with each other utilizing a communications network such as cell towers 212, as illustrated in FIG. 8B. The cell phones with GPS 210A-210G determine their various locations utilizing GPS, and can then transmit these locations to the other units over a network, if it is functioning. If the cellular network is not functioning, the center of the communications network shown on FIG. 8B as 212 becomes a server and/or laptop "server," instead of the cell tower system being the communications network. Either way, when the units are within range of a network 212, all the units 210A-210G can be determined and monitored by any one of the units. The plurality of cell phones is thus able to communicate with each other. Alternatively, they can also communicate with a base station. This feature enables the plurality of users of the cell phones to continue to perform their tasks even when they cannot establish communication with a cell phone network via a cell transmission tower. In areas which have recently been devastated by natural disasters, such as hurricanes, cell phone towers have been destroyed. The system of the present invention enables first responders and other personnel to communicate with each other and with a base station or headquarters when the only form of communication is the cell phones the first responders or other personnel are equipped with. The communications between the cell phones are both voice and data. The system of the present invention also enables a search and recovery operation to be established quickly with minimal expense and setup time.

Figure 8A:
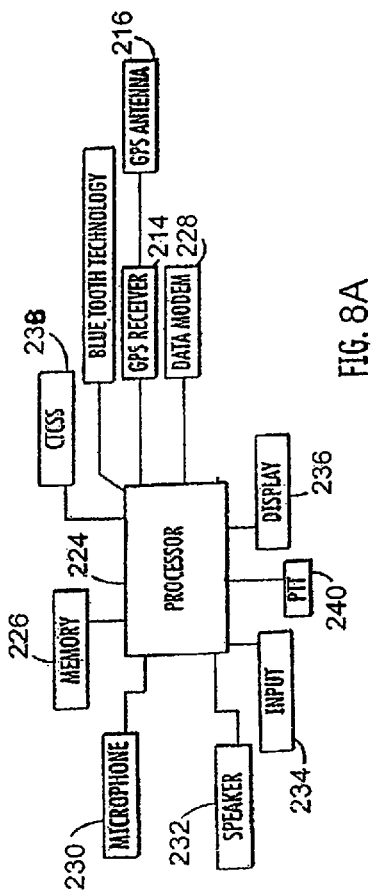
FIG. 8A is a block diagram of the components of the cell phone of FIG. 6.

Referring to FIGS. 6 and 8A, the cell phone with GPS of the present invention will now be described. The cell phone with GPS unit 210 incorporating BLUETOOTH® technology includes a GPS receiver 214 and a GPS antenna 216 mounted in or on the cell phone housing 222. The GPS receiver is electronically coupled to processor 224 which in turn is electronically coupled to a memory 226. The memory 226 can be built into the unit 210 or removably connected thereto, such as a flash memory stick or removable cartridge (both not shown). The memory will normally contain the information necessary to operate the unit 210. The memory can also be used to store cartographic data (electronic maps), waypoints or locations which the unit's operator wants to save, bread crumbs of the operator's tracks, waypoints of the other units and other assessment data, including but not limited to customized forms, notes, events, messages, and work orders, which may be input into the unit 210. The cell phone is electronically coupled to the processor 224 and a data modem 228. The data modem is utilized for transmitting and receiving data such as location data of the units.

The electronic maps stored on the memory devices can be displayed on the unit's display 236. Waypoints or areas traversed by the unit and stored in the memory can also be displayed on the display 236. In a preferred embodiment, the display 236 is a liquid crystal display (LCD) and is used to display other information in addition to navigational information. Any other type of display may also be used on the cell phone. The unit 210 also includes a microphone 230, a speaker 232 and an input 234. The microphone 230 and speaker 232 are conventional.

Input 234, in a preferred embodiment, is an alphanumeric keypad such as the keypad used on telephones. This permits the entry of letters, numbers and any other symbols found on keypads. Utilizing special software, almost any number, letter or symbol can be entered into the unit. This type of software is commonly available on cellular telephones. The input 234 could also be a microphone, a voice recognition input, a touch screen, a full keyboard similar to a BLACKBERRY® or a menu driven display screen.

The cell phone with GPS unit 210 can also include a continuous tone coded squelch system (CTCSS) 238 and a push-to-talk button 240. The CTCSS controls the audio output of the speakers so that only a desired transmission can be heard by the user of the cell phone 210. The push-to-talk button 240 can be any conventional pushbutton switch or a control device normally found on short range two-way radios. The push-to-talk button 240 is coupled with the processor 224 to combine two important functions in a single button. The push-to-talk button 240 is operable to both initiate transmission of voice communications and transmission of a radio signal which indicates the GPS location of the unit. Additionally this feature permits updated location information to be automatically transmitted each time the user transmits a voice transmission.

Activation of the push-to-talk button can also trigger a transmission of a radio signal including GPS derived location data indicating the location of the unit transmitting the radio signal. This transmission occurs normally shortly after the voice communications are complete and the push-to-talk button has been released. The processor 224 keeps the radio transceiver enabled for approximately 100-300 milliseconds to allow the transmission of the location data. The cell phone with GPS unit 210 can also include another feature which enables other individuals to determine its location. This is a "polling" feature wherein one unit 10 sends a request to the other unit's 210A-210G for them to transmit their locations back to the requesting unit. This request can be performed manually by the operator of the requesting cell phone 210 or the requesting unit can be programmed to perform this operation automatically at pre-selected time intervals. The locations of the other cell phones 210A-210G are updated on the electronic map of the requesting unit so that at any time all the units can know where all the other units are. Any and all of the units can perform this location request. If the units are programmed to perform this automatically, then no input is required by any of the operators.

Another optional feature of the cell phone with GPS is a coding or encryption system. This system can employ any of the known coding or encryption schemes such as public or private key encryption methods. To employ this feature a group of cell phone users would enter an agreed upon code into their units prior to use. The code would then encrypt the transmitted location data and the receiving units would be able to decrypt this information. This prevents other, unauthorized units from tracking the location of other units. This can be useful with groups such as law enforcement individuals.

Cell phones with GPS units which include all of these features are complicated to operate and numerous intricate operational procedures must be memorized and/or deciphered to obtain the desired results. Many individuals who are involved in search operations after disasters such as hurricanes are ordinary individuals who are not familiar with the operation of these cell phones. Therefore, for the missions to be successful, these units need to be modified so that anyone could readily operate them.

The first modification is a modification of the hardware. Before any modifications, the cell phones must have a BLUETOOTH® communication system. This communication system enables the rapid transfer of large amounts of data wirelessly between devices within a close proximity (10-20 feet). This wireless communication system enables software modifications of the cell phone, which in turn enable uncomplicated operation of the unit, and transmission of data between the cell phone and a base station server. A laptop computer can be positioned at the base station and can also serve as a "server" in this communications network.

Using as an example the Motorola Brute, Sanyo Model 7050, Pro 200 or 700 cell phones, the following modifications to the software in these cell phones are made prior to its use in the operations. Once these modifications have been made they do not need to be changed except as the user goes into and out of a working cellular network (or the network is re-established by repairs). These modifications can be made utilizing BLUETOOTH® communications from a base station or on the cell phone unit itself if the model has such capability. As another example, a BLACKBERRY® Curve Model 3330 GPS/cell phone can also be used when modified as stated above, and with additional programming and/or modifications as well as newly developed cell phone hardware, a host of other phones can utilize this system. Newer cell phone models such as Android and iOS based devices may not require extensive modification to utilize their Bluetooth® or GPS functions in a disconnected environment.

First, the cell phones with GPS and BLUETOOTH® are uploaded with the following information:

Pathfinder Task Force Eureka software which contains the following options, abilities, and features:

"Work Orders": can be tasked out to individual cell phones. Detailed information such as location, specific needs, tasks, or any "work" duties can be sent from the server to one or multiple cell phones via the system. Once sent to a phone or phones, the user has the ability to comment and enter in completion information on the work order, which then can be transmitted back to the base server, with automated time/date stamps that are geocoded at that location.

"Forms": can be customized readily on the laptop "server" or via administrative access at the base station and which optionally may integrate the text messaging feature of cell phones to complete certain information on the forms such as name and address. These forms consist of several different types of template "form fields", which are preset data-entry methods on the cell phone. These "form fields" may be customized to collect a wide range of information and the user may choose to assign branching logic or decision point logic in the forms. Comment sections can allow the user to enter any texted wording the mobile user desires. Alternatively, the forms can employ dropdown menus for pre-programmed answers which can be selected to standardize certain responses so as to increase the speed of entry of data by mobile users. For example, there can be a "minor damage or major damage" drop down option to select. When the form is submitted to be saved into the phone (or into the server if the cellular network is functioning), the system automatically geocodes and time/date stamps the information contained on that specific form. The forms may also optionally attach geocoded photos to the information so a picture can provide reference to the form information. Prior to saving the form, the user is asked if the form needs any final editing before being saved.

"Events": allows mobile users to create, invite, and confirm attendance for "Events", which are specified locations with time/date information attached within, including a description of activities and purpose.

"Notes": allows mobile users to create and submit text and photos without predetermined formatting. Mobile users may choose to submit notes privately or to any Affiliation they belong to.

"Profile Surveys": allows users to create and complete surveys that profile their skill-set, interests, likes/dislikes, and preferences for matching logic purposes inherent in the design of the Pathfinders Task Force software.

"Places": allows users to create and view locations specifically marked on a map. Users may share these "Places" with other users, and administrators may mark special places of interest for their users.

"Pathfinders": allows users to sort, select, and view other users they have affiliated with, as well as control privacy settings and search for and add new users, affiliations, or groups.

"Data View": allows users to easily access, view, and interpret GPS, submission, and location data as it appears on the map. The Data View is a front-end feature that displays selected map information in a standardized format on the cell phone.

"Aggregate Data Button": allows users to access a grid-style view of GPS, submission, and location data in chronological order. This interface provides users with the ability to sort and filter submitted information based on pre-determined attributes as well as allowing users the ability to export this information in a number of formats, compatible with $3^{rd}$ party software including but not limited to: Microsoft Excel, Tableau Server, Tableau Desktop, VirtualUSA, ArcGIS, ArcMAP Google Earth Pro, and Crystal Reports.

"Time-Frame Views": allow users to view historical data that represents the breadcrumb trail particular users traveled, based on a selected and customized time-frame selected by the user. This "breadcrumb trail" shall consist of but not be limited to: user/device path (represented by connecting arrows displayed on the map), form submissions, notes, events, and work orders submitted within the time frame selected.

"Main Menu": allows users to perform various submission-related functions in the software, including but not limited to: filling out forms, submitting a note, creating an event, completing profile surveys, and marking a place on the map.

"Clock In/Out": allows users to clock in or out of their various affiliations, meaning that a user is able to manage their privacy and submission settings for all affiliations the user belongs to. "Clocking In" represents enabling the authorized affiliation to view the user on the map and view submissions that are sent to this affiliation, while "Clocking Out" represents disabling the authorized affiliation from viewing any user-related information, including but not limited to: GPS location, Data Submissions, Location Information, and Messaging.

"Sign Out": allows users to end their current session, which turns off the client-server connection and shuts down the application.

"Form Creator": allows users to create Forms and Profile Surveys, which are accessed by authorized users to fill out and complete. This Form Creator shall be accessible via the web and mobile platforms, and utilizes a "Drag and Drop" interface to create Forms to capture customized information via a multitude of different "Field Types". These Forms must be "Deployed" before additional users may utilize the Form.

"Field Types": refer to the different types of information the user is able to capture. These Field Types include but are not limited to: Alphanumeric Entry, Numeric Only Entry, Single-Select Multiple Choice Entry, Multiple-Select Multiple Choice Entry, Geotagged Photo Upload, Geotagged Photo Attach, Checkbox, Radio Button, Signature Capture, Barcode Scan, and Submit Button.

"Deploy Forms": refers to granting certain users, groups, and affiliations authorization to submit a particular Form. Forms must be Deployed before any user other than the creator to submit, and thus, Undeployed forms are listed as "Draft".

"Organization and Assignment Screen": allows users to easily create groups, teams, and task forces to organize and manage their users. The Organization and Assignment Screen also allows users to be tasked for functional purposes, by allowing users to be assigned to Tasks, Needs, Work Orders, Events, Affiliations, and potentially other uses. Users may be organized and assigned to tasks via a "Drag and Drop" interface. Users may be sorted based on their profiles, skill-sets, ICS certifications, or other classifications via "Matching Logic".

"Matching Logic": refers to complex software algorithms that classify users based on their responses to profile surveys, allowing for users to be matched to appropriate Tasks, Needs, Work Orders, Events, Affiliations, and potentially other uses because the users' skill-sets match with the services needed. Users may be classified based on customizable information, (Ex—Profile surveys may classify based on functional skill-set, such as medical, physical, technology, leadership, etc.), and a corresponding Task, Need, Work Order, or Event may be customized to need one of these functional skill-sets. The appropriate users may then be matched to the appropriate Task, Need, Work Order, Event, or Affiliation. Likewise, as a user completes more details of his/her own profile and skill sets, that user may be better "matched" with a group or organization which has listed its own set of profiles into the system in its own search for like-minded or like-skilled users.

"Who Can See Me": refers to an ability in the software that grants the user the ability to disallow other users from viewing or receiving GPS data, submission data, and any location information about the particular user (ex—User A turns off User B's ability to see User A on the Map as well as any of User A's information).

"Friends": refers to users that the end-user has added to their application in terms of receiving tracking and electronic submission data; Users are assigned "Friend Codes", which are unique identifiers that allow for user search to take place and for user created sub-groups.

"Notifications": allow users to view at-a-glance any status updates or pertinent information from selected users, and functions as a rudimentary news feed to the user, displaying updated information about the user's affiliations, coworkers, friends, and family.

"Synch Now": allows the user to synch the cell phone with the laptop server or cloud server by utilizing either BLUETOOTH® or cellular networks.

"Start Break": allows the user to note a break time start and stop point to monitor his/her work cycle during the operations.

"Message": allows the cell phone operator or base server to text message each other or other operators via a canned, preprogrammed or custom message. Text messaging in a disaster environment can occur over partially destroyed cellular networks where voice communication has failed entirely.

"Setup": allows the user to enter into their cell phone the phone number and company name or name of the agency for which they are working.

"Change User": allows the user to change his/her password or user name.

"GPS": allows the user to check the status of the GPS tracking unit and note any errors in communication of the GPS chip within the cell phone.

"Map": allows the user to view a map as loaded by the system into the cell phone.

"BLUETOOTH® Sync": allows the user to toggle between using just BLUETOOTH® or just the cellular phone network, depending on the circumstances.

"Diagnostics": allows the user to view his/her name, phone number, software application name, version of the software application, synch interval, last synch time, last upload time, number of synchs synch errors, and message counts collected by that user.

"About": allows the user to view the name of the system, the contact info, and the version, along with a copyright date.

"Shutdown": allows the user to shutdown the Pathfinder Task Force Eureka Application.

After an operational duty has been inputted, with any related maps, the responder goes out into the designated search areas with the cell phone which has GPS features and functions. At the beginning of every day a different route or search area is programmed into each cell phone. Preferably, each team will have the same route or search area and different teams will have different routes or search areas. As the team members cover the routes or search areas they will encounter individuals or locations which require specific needs. These items can be inputted into the cell phone in the methods described above.

The system also can recognize and list the Emergency Support Functions (ESF) and categorize with possible uses as follows:

ESF #1: Transportation: Monitoring assets and equipment, transportation safety, movement restrictions and damage impact and assessment.

ESF #2: Communications: Supplement existing systems without overwhelming capacity given a large scale operation.

ESF #3: Public Works and Engineering: Locating infrastructure protection and emergency repair, including roads, bridges, potable water, sanitation, utility grid emergency needs.

ESF #4: Firefighting: First responder's monitoring and coordination for incoming, out of region, fire rescue services following any disaster.

ESF #5: Emergency Management: Coordination and command resources, monitor and assign assets, and incident action planning.

ESF #6: Mass Care, Housing and Human Services: Follow up specialty resources as identified by first response teams with software waypoint system.

ESF #7: Resource Support: Logistics location, monitoring, dispatch and distribution, with emphasis on personnel from out of the area response teams within a given disaster zone.

ESF #8: Public Health and Medical Services: Perform health services and logistics location including pharmaceutical supplies and medical personnel management, D-Mort service teams and EMS personnel locations and assignments.

ESF #9: Urban Search and Rescue: Accurate resource management and detailed tracking and mapping for 100% coverage of the affected area without costly re-searching areas previously covered.

ESF #10: Hazardous Materials: Locate and identify the precise location of various threats. Monitor and mitigate the needs to suppress these threats and prioritize the threats.

ESF #11: Food, Water and Natural Resources: Locate sources for mass food and water resources by sector. Food safety and security; locate historic properties protection and nutrition assistance.

ESF #12: Energy: Coordinate, dispatch, monitor and locate emergency energy needs and response units.

ESF #13: Military Affairs: Public safety and security—incoming units can be universally tracked and monitored for efficient management, including using military personnel for various other ESF function needs as required, including traffic management operations.

ESF #14: Public Information: Locates informational needs by street address and available resource allocation distributions.

ESF #15: Volunteers: Volunteer management of incoming personnel and resources to be distributed across ESF functions as needed using locator source system.

ESF #16: Law Enforcement: Coordinate the mobilization of law enforcement and security resources.

ESF #17: Animal Protection: Provide rescue, protective care and feeding for animals using GPS locator assistance.

ESF #18: Business and Industry and Economic Stabilization: Coordinate the response of State agencies in assisting local economic redevelopment via locator source system.

In addition to associating an ESF number with a waypoint, wherein a particular need or service has been identified by the searcher, a 1-2 word descriptor can also be associated with the waypoint. This would help to clarify any ambiguities that a third party may have regarding a particular waypoint and emergency service that was associated with the waypoint. These descriptors could also be used to identify a particular need or resource that would be required at a particular area or site.

Figure 9:
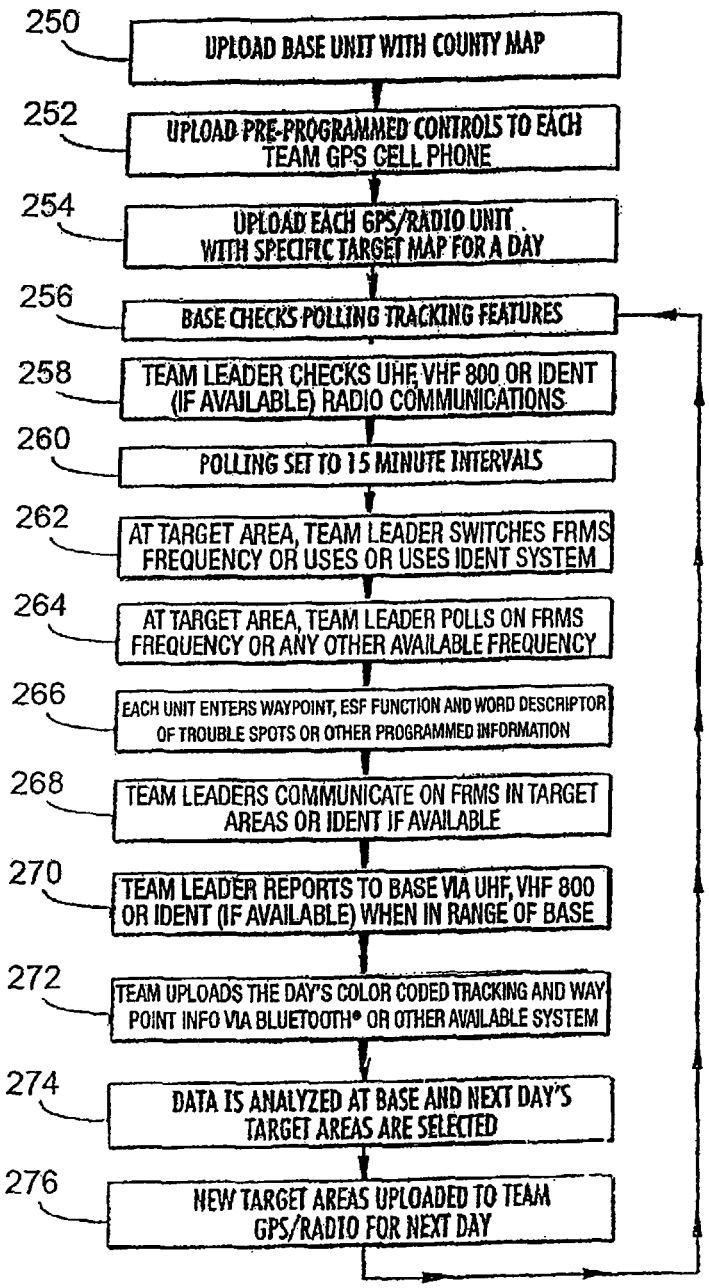
FIG. 9 is a flow diagram of the procedure utilized by the response teams.

With reference to FIG. 9, the operation of a typical search would proceed as follows. The base unit is uploaded with a map of the county or area surrounding the site of the disaster at 250. The individual team cell phones are uploaded with the Pathfinders Task Force Eureka software and with pre-programmed controls and settings at 252. The individual team units are uploaded with a specific target search map for one day at 254. The team members upload the routes covered, searched areas, assessment data, and waypoints from that day to the base station at 272. While the upload is preferably preformed wirelessly, any other type of data transfer is acceptable. These routes or search areas may be color coded. Any photos taken using the software can be tied directly to a related, custom form, all of which, when saved, is automatically time/date stamped and marked with that location via GPS. The data uploaded into the base station unit is analyzed and the next day's search areas or route are determined at 274. The new search areas or route are uploaded into the teams' individual cell phones at 276 and the procedure then returns to step 256. While the new routes are preferably uploaded wirelessly, any other type of data transfer is acceptable.

The data is mapped out on a GPS mapping system which allows shape files to be overlaid for a more robust analysis. Further, the latitude-longitude information can be readily converted automatically within the system to the National Grid System which is used more by military responders. Likewise, the system may be integrated with Virtual USA to ensure interoperability with a wide variety of software mapping systems. Additionally, the system can easily convert all of the collected data into Excel spreadsheets, which then are easily sorted using Excel technologies. Data can then be e-mailed out in a readily workable solution and/or can be converted into pie charts or other graphic images using, for example, Microsoft Access® to present a snapshot picture of thousands of data inputs from a single or multiple days' operations. Data can also be exported in a number of other forms, including but not limited to: Virtual USA formats, ArcGIS point lists, CSV files, KMZ, or imports into Tableau Desktop and Tableau Server.

Figure 10:
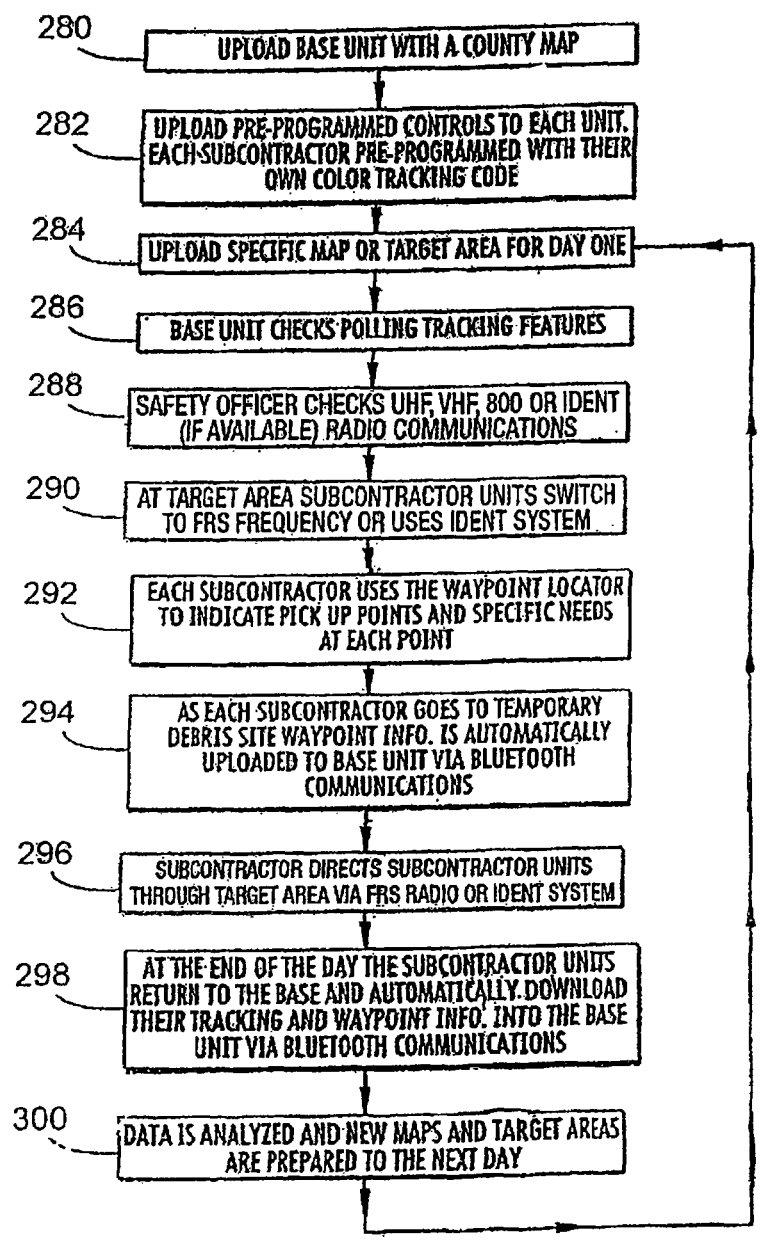
FIG. 10 is a flow diagram of the procedure utilized by a cleanup contractor.

With reference to FIG. 10, the procedure of a typical cleanup operation after a disaster is described. The base unit is uploaded with a map of the area surrounding the site of the disaster at 280. The subcontractors' units are pre-programmed with Pathfinders Task Force Eureka software and with controls, settings and color codes at 282. The subcontractors' units are uploaded with a specific map or target area for the day at 284. The safety officer checks the UHF, VHF or 800 MHz frequency communications or iDEN features of the individual cell phones at 288. The subcontractors proceed to a temporary debris site within the target area. At this location the waypoint information which they have collected that day is downloaded to a unit at the temporary debris site via BLUETOOTH® communications at 294. This information is subsequently sent to a base station. Any photos taken using the software can be tied directly to a related, custom form, all of which, when saved, is automatically time/date stamped and marked with that location via GPS. At the end of the day or during the work cycle, the subcontractor units return to the base station and automatically download their tracking and waypoint information to a base station unit via BLUETOOTH® communications at 298. Alternatively, a field server may be deployed with the software loaded into it to afford mobile users a remote download location without returning to a base. The data is analyzed and new maps and target areas are prepared for the next day's operation at 300 and the procedure then returns to step 284.

Figure 11:
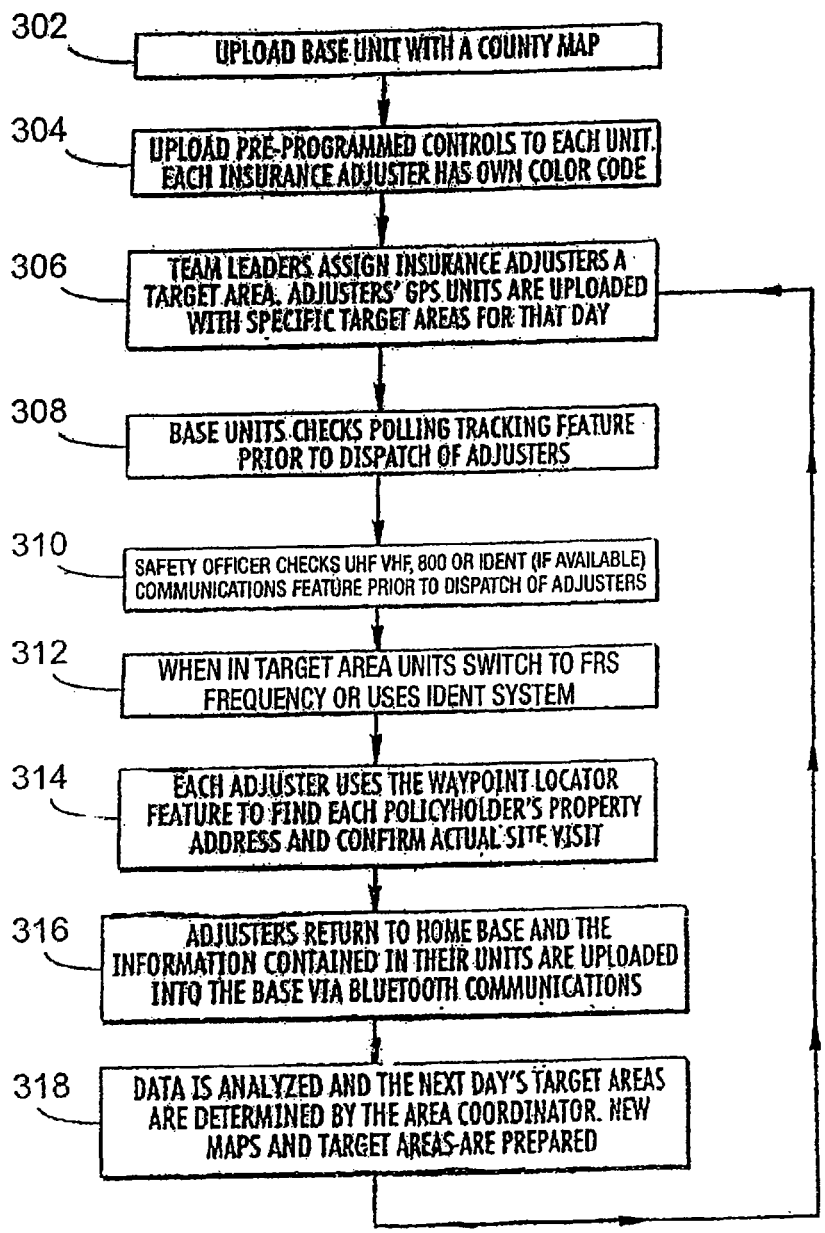
FIG. 11 is a flow diagram of the procedure utilized by insurance company adjusters.

With reference to FIG. 11, the operation of a typical insurance company's adjuster's visit to a disaster area is described. The base station unit is uploaded with a map of the area surrounding the site of the disaster at 302. The adjuster's units are pre-programmed with Pathfinders Task Force software and with controls, settings and color codes at 304. The team leaders assign the insurance adjusters a target area to be covered and the adjusters' cell phones are uploaded with pre-programmed controls, settings and color codes at 306. Each insurance adjuster uses the waypoint locater feature of their cell phone with GPS to locate each policyholder's property address and confirm the actual visit to the site at 314. The adjuster can then make notes regarding damages to the property in their own computers or other devices. Any photos taken using the software can be tied directly to a related, custom form, all of which, when saved, is automatically time/date stamped and marked with that location via GPS. The insurance adjusters return to the base station and the information contained in their units is uploaded into the base station unit via BLUETOOTH® communications at 316. Alternatively, a field server may be deployed with the software loaded into it to afford mobile users a remote download location without returning to a base. The data is analyzed and the following day's target areas are determined by the insurance coordinator. New maps and target areas are prepared for the following day at 318 and the procedure then returns to step 306.

In addition to utilizing cell phones to implement the system of the present invention, smartphones, such as the iPHONE® and tablet personal computers, such as the iPAD® can also be utilized to implement the system of the present invention. FIGS. 7A and 7B illustrate the front and back of a typical smartphone 301. The front of the smart phone includes a screen 303 which displays images and data obtained by the software programs of the smartphone. Buttons or controls 305, 4 of which are illustrated, extend along a lower portion of the smartphone. These buttons or controls are employed to perform different functions, depending on the software within the smartphone. A speaker 307 is located proximate an upper portion of the smart phone. This speaker is normally used to broadcast audio transmissions received by the smart phone. The smartphone is preferably encased in a material 309 which protects the smart phone from damage. A camera 311 is located on the rear portion of the smartphone. The camera is used to record video images for retention on the smartphone or transmission to another location. Each photo taken using the software can be tied directly to a related, custom form, all of which, when saved, is automatically time/date stamped and marked with that location via GPS. A connection 313 on an upper portion of the smart phone enables auxiliary devices, such as ear buds, to be connected to the smartphone. Another control 315 is located along a side of the smart phone. Control 315 is similar to controls 305.

A tablet personal computer, such as an iPAD®, is illustrated in FIG. 7C. The tablet computer 318 includes a screen 322 on the front of the computer. The screen 322 displays images and data obtained by the tablet computer. A control button 323 is located on the front of the tablet computer and in a lower portion thereof. Control button 323 is used to select certain options available within the software on the computer. The options can be, for example, Go Back, View the Operating System Main Menu, Search, etc. The control button is similar to the controls 305 and 315 on the smartphone. Button 323 can perform many different functions dependent upon the software operating within the tablet computer. A camera 325 is located in an upper portion of the front of the tablet computer 318. The camera is used to record video images for retention on the tablet computer or transmission to another location. Each photo taken using the software can be tied directly to a related, custom form, all of which, when saved, is automatically time/date stamped and marked with that location via GPS. One or more speakers 326 are located proximate a lower portion of the tablet computer. This speaker is normally used to broadcast audio transmissions received by the tablet computer. Buttons or controls 320, 321 extend along a side portion of the tablet computer. Button 320 can be employed to lock the computer from receiving any user input. Button 321 can be a volume control button. These buttons or controls are employed to perform different functions, depending on the software within the tablet computer. A button 319 on an upper portion of the tablet computer puts the computer into a hibernation mode and awakens it from this mode. Headphone jack 324, on an upper portion of the computer, permits audio output devices to be connected to the computer.

Figure 12:
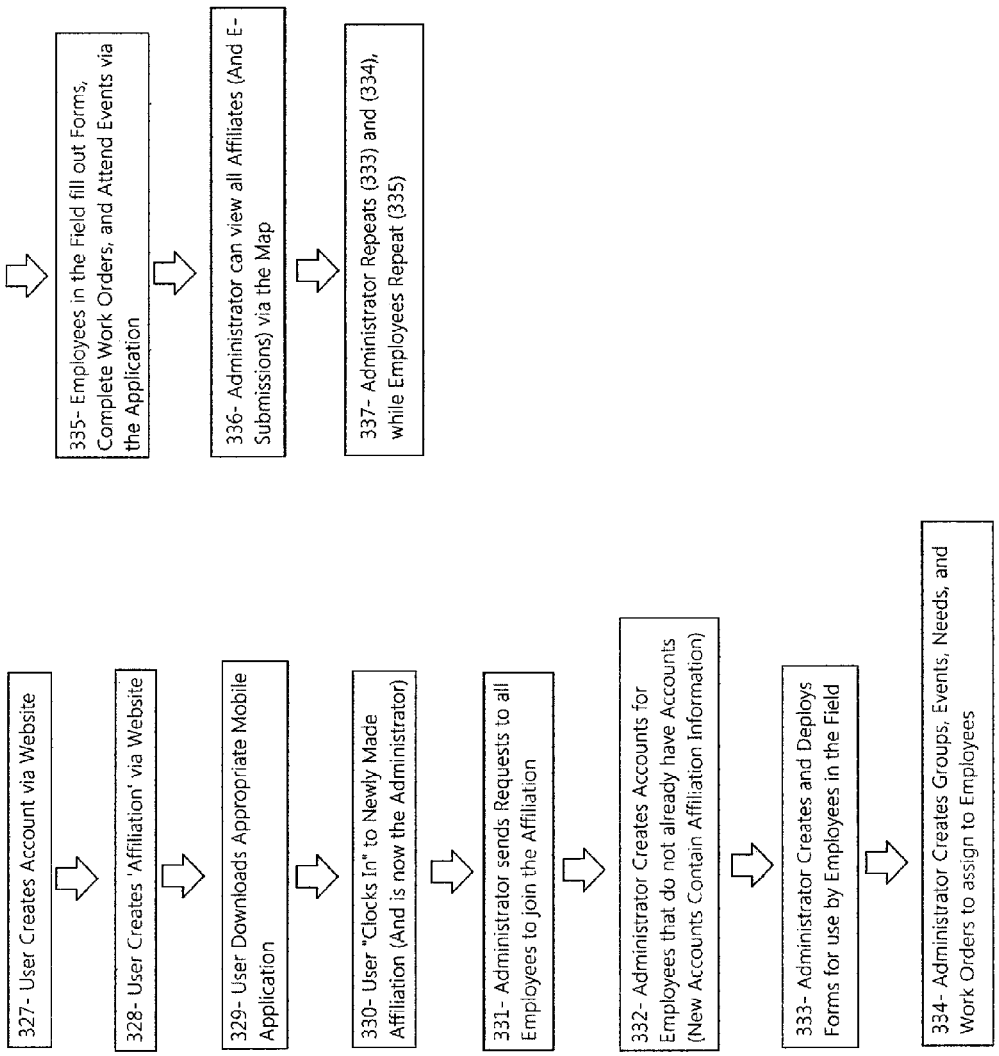
FIG. 12 is a flow diagram of the procedure utilized by a business for workforce management.

FIG. 12 is a flow diagram illustrating how a cell phone or mobile communication device can be employed utilizing the present invention to manage a workforce. At step 327 user creates an account via a Website. Next, at 328, the user creates an "affiliation" via a Website. Then, at 329, the user downloads the appropriate mobile application(s). Once these are installed, the user "clocks in" to the newly made affiliation and now becomes the administrator, at 330. Next, the user sends requests to all employees to join the affiliation at 331. The user then creates accounts for the employees that do not already have accounts at 332. These new accounts contain affiliation information. Then, the user creates and deploys forms for use by employees in the field at 333. Next, the administrator creates groups, events, needs and work orders to assign to employees at 334. The employees in the field then fill out forms, complete work orders and attend events via the application at 335. The administrator can view all the affiliates and e-submissions via the map at 336. Finally, at 337, the administrator repeats steps 333 and 334, while the employees repeat step 335.

Figure 13:
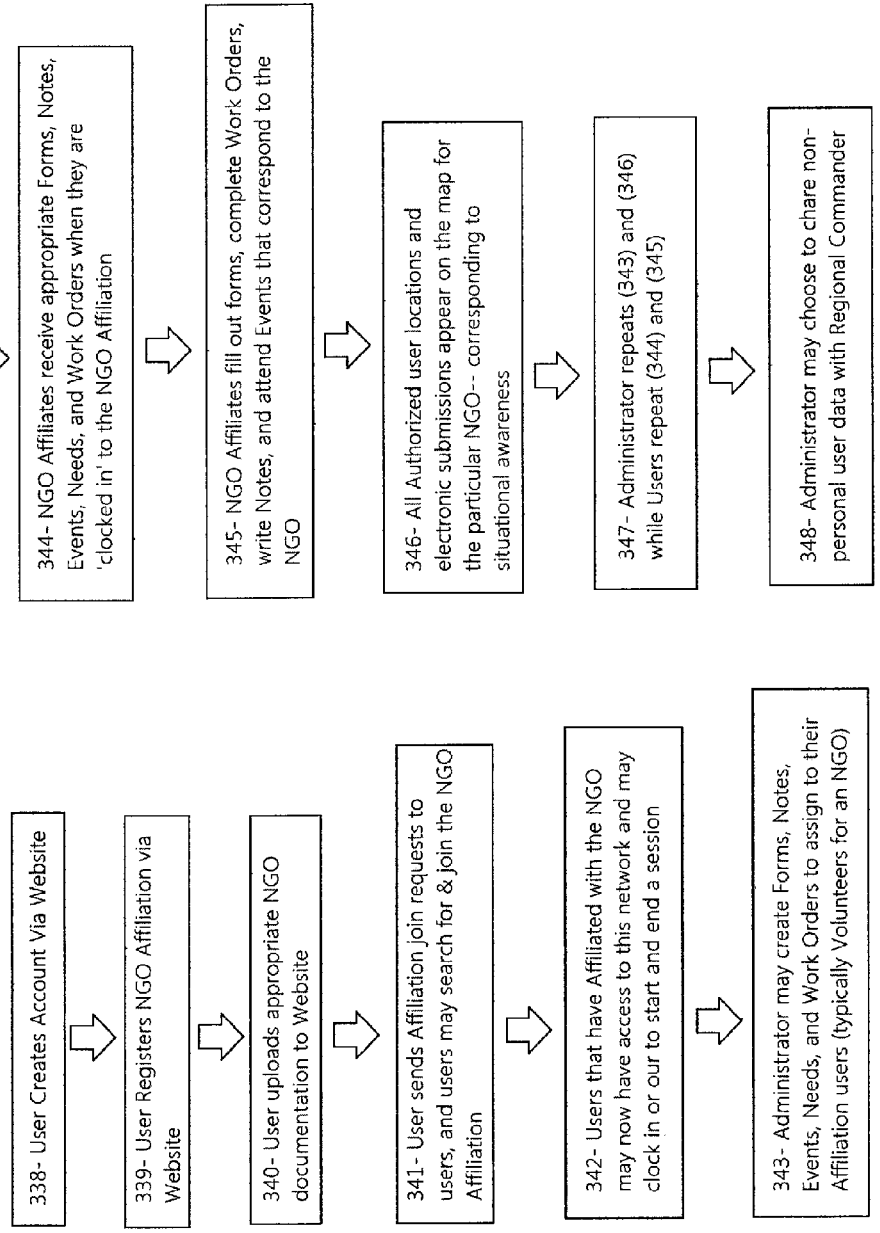
FIG. 13 is a flow diagram of the procedure utilized by a Non-Governmental organization for volunteer management.

FIG. 13 is a flow diagram illustrating non-governmental organization (NGO) volunteer management. First, at step 338, a user creates an account via a Website. Next, the user registers the NGO affiliation via the Website at 339. Then, the user uploads appropriate NGO documents to the Website at 340. The user next sends affiliation join requests to specific users, or users may search for and join the NGO affiliation at 341. At 342, the users that have affiliated with the NGO may now have access to this network and may clock in or out to start and end a session. The administrator may create forms, notes, events needs and work orders to assign to their affiliated users (typically volunteers for an NGO) at 343. Likewise, with the mobile user's completed skill sets and submitted certifications, the NGO may choose to Type the mobile user, using Incident Command System (ICS) typing guidelines. Each NGO may customize these Typing features to meet their agency needs, but with 5-7 Type levels, the NGO can far better pair skill sets of personnel with the needs of the specific tasks at hand. (This Typing feature is not limited to just volunteer operations covered in this subsection) Next, at 344 the NGO affiliates receive appropriate forms, notes, events, needs and work orders when they are "clocked in" to the NGO affiliation. Then, at 345, the NGO affiliates fill out forms, complete work orders, write notes and attend events that correspond to the NGO. At 346, all authorized user locations and electronic submissions appear on the map for the particular NGO, corresponding to situational awareness.

Then at 347, the administrator repeats steps 343 and 346 while the users repeat steps 344 and 345. Finally, at 348, the administrator may choose to share non-personal user data with a regional commander.

Figure 14:
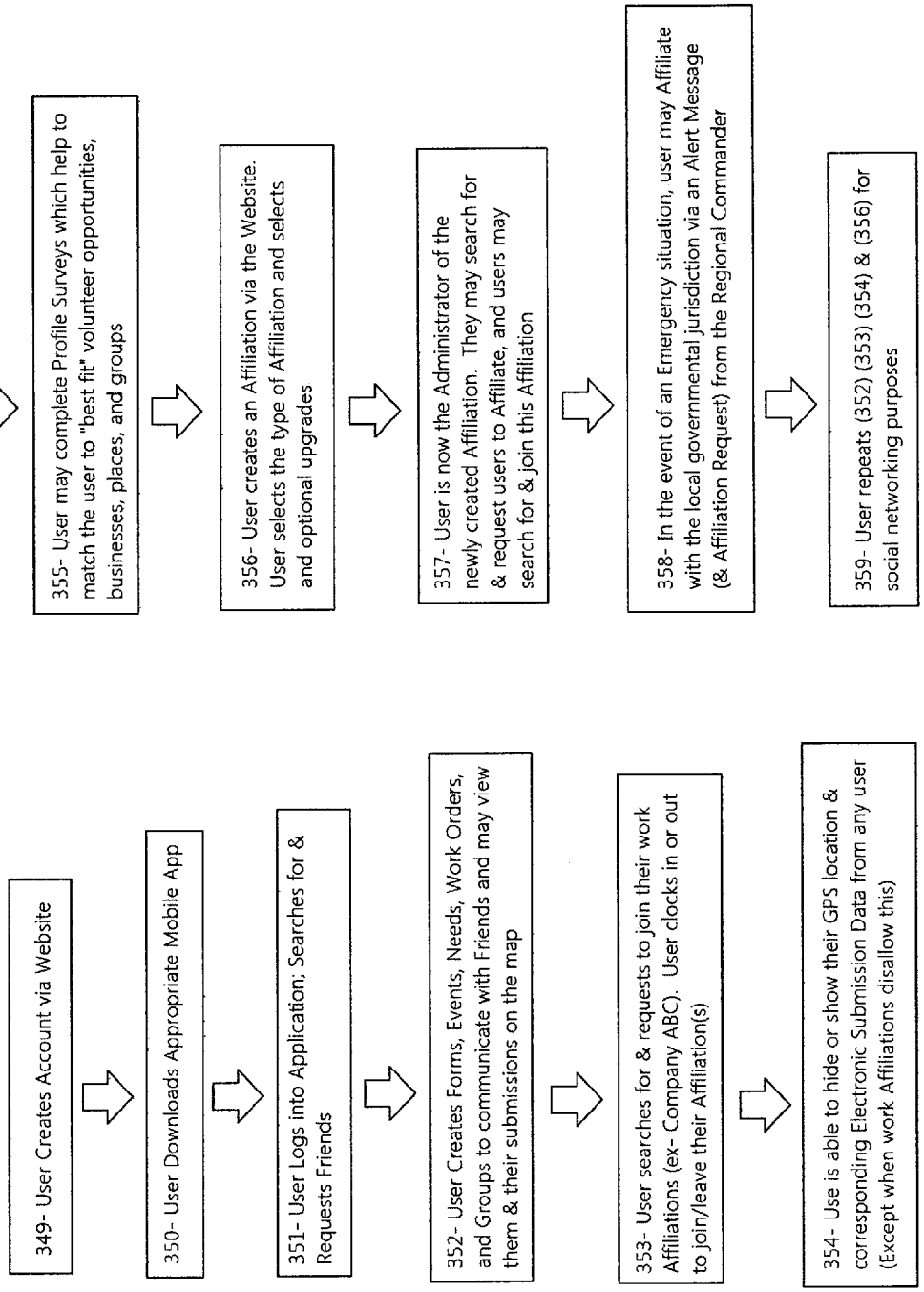
FIG. 14 is a flow diagram of the procedure utilized by an End-User for social networking and GPS tracking for event creation and management.

FIG. 14 is a flow diagram illustrating end user social networking. At step 349, a user creates an account at a Website. Then, at 350, the user downloads appropriate mobile application(s). Next, at 351, the user logs into the application and searches for and requests friends. Next, at 352, the user creates forms, events, needs, work orders, and groups to communicate with the friends and may view them and their submissions on the map. Then, at 353, the user searches for and requests to join their work affiliations (for example, company ABC). The user then clocks in or out to join or leave their affiliations. At 345, the user is able to hide or show their GPS location and corresponding electronic submission data from any user (except when work affiliations disallow this). Next, at 355, the user may complete profile surveys which help match the user to "best-fit" volunteer opportunities, businesses, places and groups. At 356, the user creates an affiliation via the Website. The user selects the type of affiliation and selects any optional upgrades. At 357, the user can become an administrator of the newly created affiliation, if authorized. Different administrative levels can allow for different levels of controls of the system itself. Administrators may search for and request users to affiliate and users may search for and join this affiliation. Administrators also can track hours logged by mobile users as well as a host of other valuable field data. In the event of an emergency situation, the user may affiliate with local governmental jurisdiction via an alert message and affiliation request from the regional commander at 356. Finally, at 359, the user repeats steps 352, 353, 354, and 356 for social networking purposes.

Figure 15:
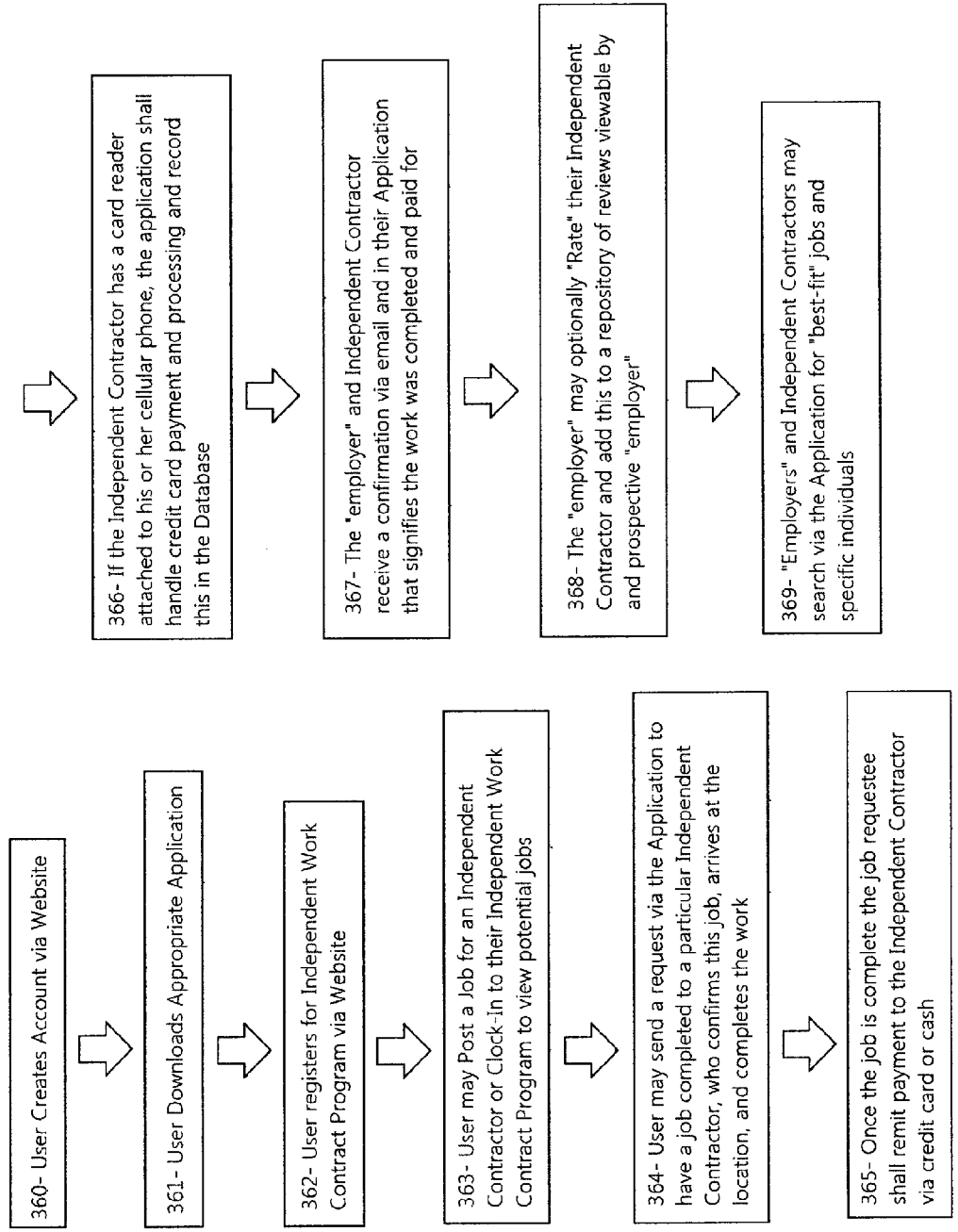
FIG. 15 is a flow diagram of the procedure utilized by an independent contractor and/or potential employer to post jobs, find jobs, complete jobs, and have payment processed for jobs.

FIG. 15 is a flow diagram illustrating independent work contracts and jobs. At step 360 a user creates account(s) via a Website. At 361, the user downloads the appropriate application(s). Next, at 362, the user registers for the independent work contract program via a Website. The user can now post a job for an independent contractor or "clock in" to their independent work contract program to view potential jobs, at 363. Next, at 364, the user may send a request via the application to have a job completed to a particular independent contractor, who confirms this job, arrives at the location, and completes the work. Once the job is complete, the job requestee can remit payment to the independent contractor via credit card or cash at 365. If the independent contractor has a card reader attached to his cellular phone, the application can handle the credit card payment and processing and record them in a database at 366. Next at 367, the "employer" and independent contractor receive a confirmation via e-mail, and in their application, that signifies that the work was completed and paid for. At step 368, the "employer" may optionally "rate" their independent contractor and add to a repository of reviews viewable by any prospective "employer". Finally, at step 369, the "employers" and independent contractors may search via the application for "best-fit" jobs and specific individuals using the system's matching logic features.

Figure 16:
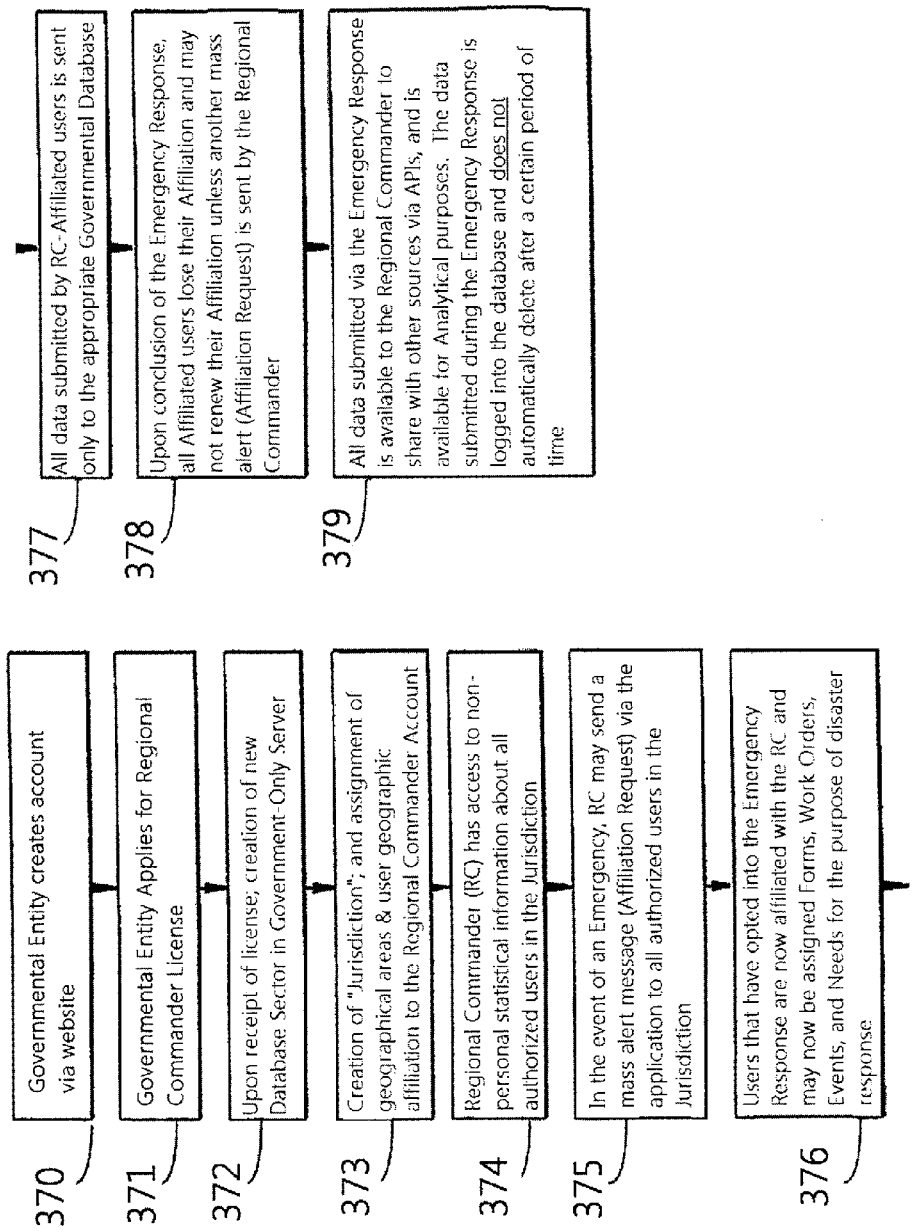
FIG. 16 is a flow diagram of the procedure utilized by a regional commander to manage resources and assets in the event of an emergency.

FIG. 16 illustrates a flow diagram demonstrating how a regional commander (RC) can gain access to various areas and information. First, at step 370, a governmental entity creates an account via a Website. Then, at 371, the governmental entity applies for a regional commander license. Upon receipt of the license, a new database sector in a government only server is created at 372. Next, at 373, a "Jurisdiction" is created and an assignment of geographical areas and user geographic affiliation to the regional commander account occurs. Then the regional commander (RC) has access to non-personal statistical information about all authorized users in the jurisdiction at 374. In the event of an emergency, the RC can send a mass alert message (affiliation request) via the application to all authorized users in the jurisdiction at 375. Users who have opted into the emergency response are now affiliated with the RC and may now be assigned forms, work orders, notes, tasks, events, and needs for the purpose of disaster response at step 376. All data submitted by RC affiliated users is sent only to the appropriate governmental database sector at 377. Then, at 378, upon conclusion of the emergency response, all affiliated users lose their affiliation and may not renew their affiliation unless another mass alert (join request) is sent by the Regional Commander. Finally, at 379, all data submitted via the emergency response is available to the Regional Commander to share with other sources via APIs and is available for analytical purposes. The data submitted during the emergency response is logged into a selected database and does not automatically delete after a certain period of time.

In addition to the users listed above, this system can be employed by any and all members of a first responder services such as Homeland Security, the military, the National Guard, Hazardous Material teams, non-governmental responders, volunteer groups, long term recovery organizations, public works department personnel, private sector units, all other ESF personnel, and the Emergency Management Assistance Compact (EMAC). These individuals and associations will normally use the present invention to assist in the recovery, mitigation, and preparedness for natural disasters such as hurricanes, tornadoes, floods and snow storms. However, the present invention can be used for any situation wherein a number of people require assistance like fires, power blackouts, etc., or just for social networking on a daily basis.

The system of the present invention can be employed to provide a functional and efficient database to serve as the repository for all information gathered in the field via the cell phone equipped with GPS and having GPS functions with BLUETOOTH®. This database shall be separated into sectors accessible based on user permission and user affiliations to other organizations contained inside the cell phone software. The system also may allow for a separate database storage system at a specifically desired location, like a user's normal offices.

The system of the present invention can also provide the means for an authorized and affiliated Governmental entity (typically a County or Parish's Emergency Management Team) to control a disaster response operation via the cell phone equipped with GPS and having GPS functions with BLUETOOTH®, which is interfaced with a web-based version of the cell phone software meant for administrative purposes. This affiliated Governmental entity (henceforth referred to as the "Regional Commander") may submit a mass-alert to authorized users that serves as an "opt-in" program to the particular disaster response operation. This ability (via the customized cell phone software) allows the Regional Commander to organize and task both his responders and what would normally be spontaneous volunteers with no affiliation or tasking. It is yet a further objective of the invention to provide workforce and business management tools via the cell phone equipped with GPS and having GPS functions with BLUETOOTH® which can automatically download data stored on the cell phone to an internet-based server (generally referred to as the "Cloud"). All authorized data that is submitted in the field may be accessed by authorized users as soon as it is available on the server, near-instantaneously when the cell phones and server are connected to a wireless network, or after the data has been uploaded via BLUETOOTH® technology in a disconnected environment. Given the sensitivity of the data, encryption and security are always of the utmost priority.

The system of the invention allows users to create discrete groups, businesses, organizations, and affiliations via the cell phone equipped with GPS and having GPS functions with BLUETOOTH® technology for the purpose of business management and user privacy. Groups, businesses, organizations, and affiliations are treated as discrete entities by utilizing the customized cell phone software that contains a private sector of the database that only authorized users may access. Users may "clock in" or "clock out", utilizing the customized cell phone software, to enable or disable affiliation with a group, business, organization, or affiliation.

The present invention also provides an easy to view interface via the cell phone equipped with GPS and having GPS functions with BLUETOOTH® technology to easily convey and display pertinent field-gathered information. This will be accomplished through the use of an interactive map display via the cell phone equipped with GPS and having GPS functions with BLUETOOTH® technology. Authorized data shall be displayed to authorized users via an interactive map that allows said users to easily access, edit, delete, and submit field-gathered information.

Customization tools are also available via the cell phone equipped with GPS and having GPS functions with BLUETOOTH® technology, such that responders and users in the field can customize and standardize the type of information they collect. One of these tools is the "Form Creator". The purpose of a "Form Creator" is that information collected in the field can be customized to fit any particular need as well as creating a standardized reporting format between workers via a "drag and drop" method (in the cell phone software) to create custom-built forms.

Organization tools are also available via the cell phone equipped with GPS and having GPS functions with Bluetooth® technology, such that responders and users in the field can customize the organization of their workers and users. This generally refers to giving users the ability via the cell phone equipped with GPS and having GPS functions with BLUETOOTH® technology to "drag and drop" user representations (in the cell phone software) to assign them to organizations and groups, and in emergency management events, into chain of command charts for both paramilitary and military responses.

Inventory management related tools are also available via the cell phone equipped with GPS and having GPS functions with BLUETOOTH® technology, such that responders and users in the field can easily create and maintain inventory lists for further reference. This generally applies to disaster environments, primarily for critical inventory management, but is applicable to non-disaster scenarios.

Tools for mobile independent contractors to find jobs while in the field are also available via the cell phone equipped with GPS and having GPS functions with BLUETOOTH® technology, such that potential employers may list jobs on a map (via the customized cell phone software) and be contacted by potential independent contractors to complete the jobs. This is applicable to disaster and non-disaster scenarios due to the potential flexibility of usage.

The present invention can also provide a mobile credit card payment system and credit card payment gateway for mobile independent contractors to process payment via the cell phone equipped with GPS and having GPS functions with BLUETOOTH® technology, for jobs completed in the field. This mobile credit card payment system and credit card payment gateway can be implemented via pre-existing external attachments to the cell phone that allow for magnetic-strip cards to be read, interpreted, and processed for payment (via the customized cell phone software, credit card payment gateway, and database), which represents the employer's payment of the independent contractor's fees to complete a specific job.

The present invention can also provide privacy controls via the cell phone equipped with GPS and having GPS functions with BLUETOOTH® technology for the purpose of allowing users in non-disaster purposes the ability to "hide" their location and information submitted from other discrete users, groups, businesses, organizations, or affiliations. The nature of GPS tracking necessitates that privacy controls be implemented via the customized cell phone software in order for the invention to be viable on a day-to-day basis. It is yet a further objective of the invention to provide the user easy means via the cell phone equipped with GPS and having GPS functions with BLUETOOTH® technology to change settings in the cell phone software related to user Profile Information, GPS & Locations Settings, BLUETOOTH® Synchronization, WiFi Synchronization, and privacy controls. All of these settings change settings in the cell phone software. This can be accomplished by pre-programming a single "push button" on a cell phone or device to perform all of these functions when activated.

The present invention also provides a system and method for identifying or classifying members of a response team based on their knowledge, skills and abilities to perform particular functions. The members of the response team can be professional individuals or volunteers. The members of the response team are preferably identified or classified into "Types" based on completion of FEMA sponsored National Incident Management System (NIMS) instructional and command-oriented classes, based on previous disaster response experience, or based on defined parameters by the system of the present invention and each "Type" can have sub-categories. The following "Types" are a preferred embodiment and additional "Types" are also possible:

Type V—Entry level. Inexperienced and untrained volunteer. Has photo identification. Has signed Pathfinders volunteer application, release, and volunteer handbook.

Type IV—Inexperienced with some training. Has completed a criminal background check. Completed NIMS courses IS-100.a and IS-700.a. Completion of Pathfinders task force orientation. Has photo identification. Has signed Pathfinders' volunteer application, release, and volunteer handbook.

Type III—Inexperienced with some command training. Has completion of criminal background check. Completed NIMS courses IS-100.a, IS-200.a, and IS-700.a. Basic first aid and CPR knowledge. Completion of Pathfinders Task Force® orientation. Has photo identification. Has signed Pathfinders volunteer application, release, and volunteer handbook. Completion of Pathfinders Task Force® orientation. Has photo identification. Has signed Pathfinders' volunteer application, release, and volunteer handbook.

Type II—Some experience with full command training. Has completion of criminal background check. Completed NIMS courses IS-100.a, IS-200.a, ICS-300, IS-700.a, and IS-800.b. First aid and CPR knowledge. Completion of Pathfinders Task Force® orientation. Has photo identification. Has signed Pathfinders' volunteer application, release, and volunteer handbook.

Type I—Experienced with command training. Has completion of criminal background check. Completed NIMS courses IS-100.a, IS-200.a, ICS-300, ICS-400, IS-700.a, and IS-800.b. First aid and CPR knowledge. Completion of Pathfinders Task Force® orientation. Verifiable field experience. Has photo identification. Has signed Pathfinders' volunteer application, release, and volunteer handbook.

Software contained within the cell phones will sort the individuals or volunteers based on the above noted criteria for matching their skills and talents with the needs of an organization to accomplish a job or task. The individuals or volunteers can upload their NIMS course certificates via a portal on the Pathfinders Task Force software website or upload it utilizing the cell phone software. The courses can be verified and entered into the system via the server-side database of the cell phone software. This updates the cell phone software to sort and "Type" the individuals or volunteers.

An organization screen or organization and assignment screen on the cell phone, together with the software on the cell phone, permits an individual or user of the cell phone to organize individuals or volunteers and assign them to events, work orders, groups, or needs based on their knowledge, skills, and abilities to perform particular functions.

The invention also provides the user with tools for integration with existing software, via software APIs, such that the data collected via the cell phone software system may be exported and integrated for additional disaster response uses, reporting, analytical, or business development purposes.

The present invention further enables 2-way satellite communication via cell phones and satellite devices that transmit data through the satellite network as opposed to through cellular signal. These devices permit the operator of the cell phone to be "online" at all times, even when the device is disconnected from cellular service, and will greatly aid in disaster recovery operations.

The present invention also involves a process or method wherein a small crew, team, and/or family unit could set user-defined administrative settings which strictly restrict or allow selective GPS visibility in the mobile and/or desktop software application. These user-defined administrative settings should allow for user data in the form of geo-tagged photos, events, forms, tasks, and locations to be encrypted in the mobile and/or desktop software application before this data is sent to the server. As per this technical process, only authorized users' mobile and/or desktop applications possess the corresponding private key to decrypt this data. For further safety and security monitoring, additional administrative settings allowing remote access to the handset may be enabled. These additional administrative settings include but are not limited to: turning on the handset microphone, either forward or backward facing cameras, and browsing history. This invention therefore has administrative settings that can be enabled or disabled in certain builds of the application. These administrative settings further encrypt locations in the application and help ensure safety. This process allows very strict monitoring of a small crew or family unit by an administrator within a protected silo.

Figure 17:
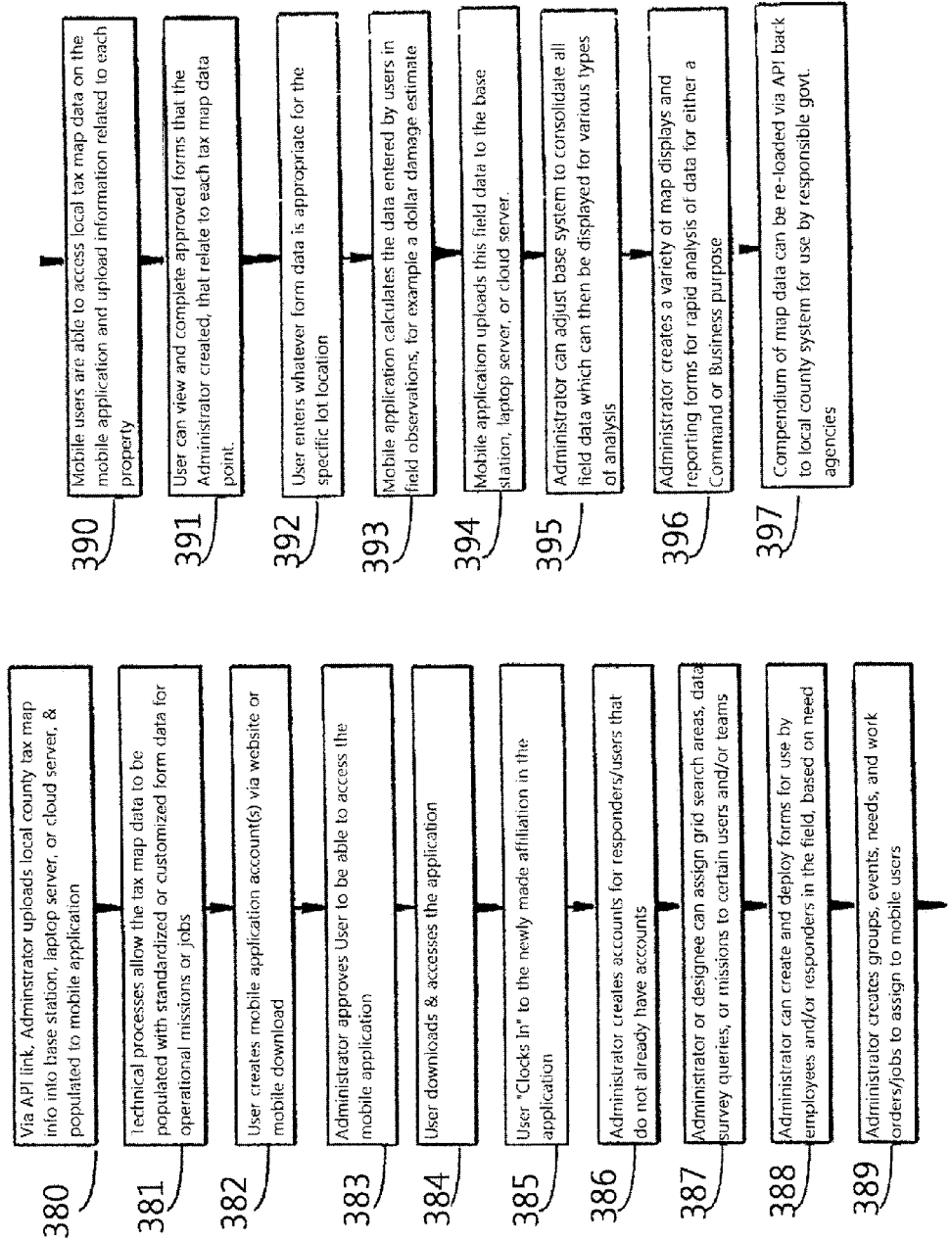
FIG. 17 is a flow diagram of the procedure for GPS enabled software to interact with a software to upload public data.

FIG. 17 is a flow diagram illustrating a process or method on the GPS enabled phone software interacting with the software system and uploaded, local, publicly stored government data such as a local tax assessor's ESRI data information base merged into the system via an API link. Such tax data bases contain individual lot I.D. numbers, lot sizes, owner's names, addresses, contact information, often detailed floor plans, valuations, zoning, building permit information, construction history, etc. Such tax maps also can reveal critical infrastructure details and locations as well. Step 380 illustrates an upload via an API link of the local county tax data base into a secondary or remote third party independent data storage device such as the base station, laptop server, or cloud server such that this information then can be populated into the map in the mobile and/or desktop software application. Step 381 is when the technical process allows these map points to be populated with standardized or customized form data and tasked to users for operational missions or jobs. At step 382, a user creates account(s) via a Website; and at Step 383, the Administrator needs to approve the User to allow access to the mobile app. At 384, the user downloads the appropriate application(s), and at Step 385, the User "Clocks In" to the newly made affiliation. Step 386 shows the Administrator creating an account for users that do not already have accounts. At Step 387, the Administrator or his designee can assign certain grid search areas or data survey queries to certain users and/or teams. The Administrator can create and deploy forms for use by employees and/or responders in the field at Step 388 based on the needs. Step 389 shows the Administrator creating groups, events, needs, and work orders to assign to mobile users. At Step 390, mobile users are be able to access the consolidated mobile mapping and local tax data on any specific lot by uploading the specific point within an illustrated set of lot lines via a touch screen on the phone. Every lot on the mobile map can have such a touch point to allow the user to pull up the background, detailed data. With the mobile application now revealing the lot's designated data at Step 391, the user can view the Administrator's choice of field viewable data, which will contain form fields with either fill in options or drop down options to rapidly collect GPS field data about that lot. Step 392 illustrates the mobile user entering whatever form data or selecting an appropriate drop down option as may be appropriate for that lot location. Step 393 illustrates the user's mobile application calculating the data entered by these field observations. One example of an input could include the mobile user's observations of the percentage of damage to the structure, which can be numerically entered into the form field or by selecting an appropriate drop down option, where the GPS enabled mobile application can note the GPS coordinates, the time and date of the entry, and the user ID number for subsequent accountability. The user also has the option of taking photos of the lot, which photos are tied to the form and its data. By entering a number or a drop down, pre-scripted, percentage of observed damage, the GPS enabled phone software can auto-calculate the actual dollar damage estimate, based on the local tax assessor's valuation and/or based upon the user's inputted field observations. After auto-calculating the damage observed, a color code can be associated with a predetermined damage valuation or other needs at GPS location. Color codes can be displayed on a map whereby damage to a location and/or resources needed to address the specific damage, need, or assistance to an area can be determined. Additionally, the color codes can be displayed on a mobile user's software application on their phone, a web application, or combination thereof. On viewing a host of such locations on a map, color codes, and especially groups of similar colors, a user readily could identify areas of need or areas with little needs. Patterns based on such group color codings could lead to quicker evaluations and more efficient responses. Data from the mobile user's software or software application can also be transferred to a remote storage device, such as the base station, laptop server, or cloud server as described above. A designated color code also can be auto-assigned to each lot ahead of sending users out for assessments, based on the Administrator's tasking. For example, the base station, laptop server, and/or cloud server may auto-calculate and/or analyze impacts and needs to pre-defined geographic areas, with views of groups of color codes as described above. Step 394 documents the mobile application uploading its field data back into the base station, laptop server, or cloud server. At Step 395, the Administrator can adjust the base system to consolidate all of the field data into the system's data base which can then be queried for any and all of the geotagged and time date stamped data gathered from a host of users to analyze a variety of impacts to a local community. At Step 396, the Administrator can create a variety of map displays, color coded and data driven, reporting forms like ICS 209 forms, graphic and tabular displays—all for rapid analysis of large amounts of data into simplistic displays for either a Command or business application. The Administrator also could choose to display miniature thumbnail photos on the base maps, with the photos each bordered by the same chosen color codes to again quickly reveal patterns of lot assessments. Step 397 illustrates how this compendium of map data can then be re-loaded via an API back into the local county system for use by a host of responsible government agencies. Step 397 illustrates how the Administrator can repeat Steps 387, 388, 395-397, while the user can repeat Steps 389-394 as needed.

Figure 18:
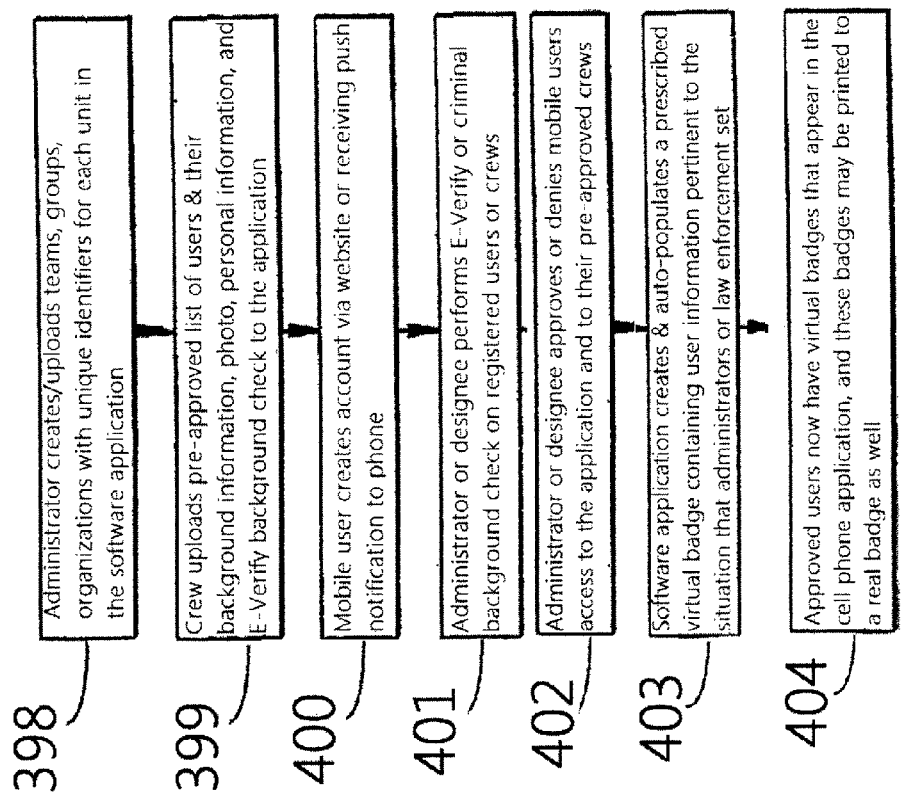
FIG. 18 is a flow diagram wherein a screen or view of a handset contains a virtual "badge" or identification.
Figure 20:
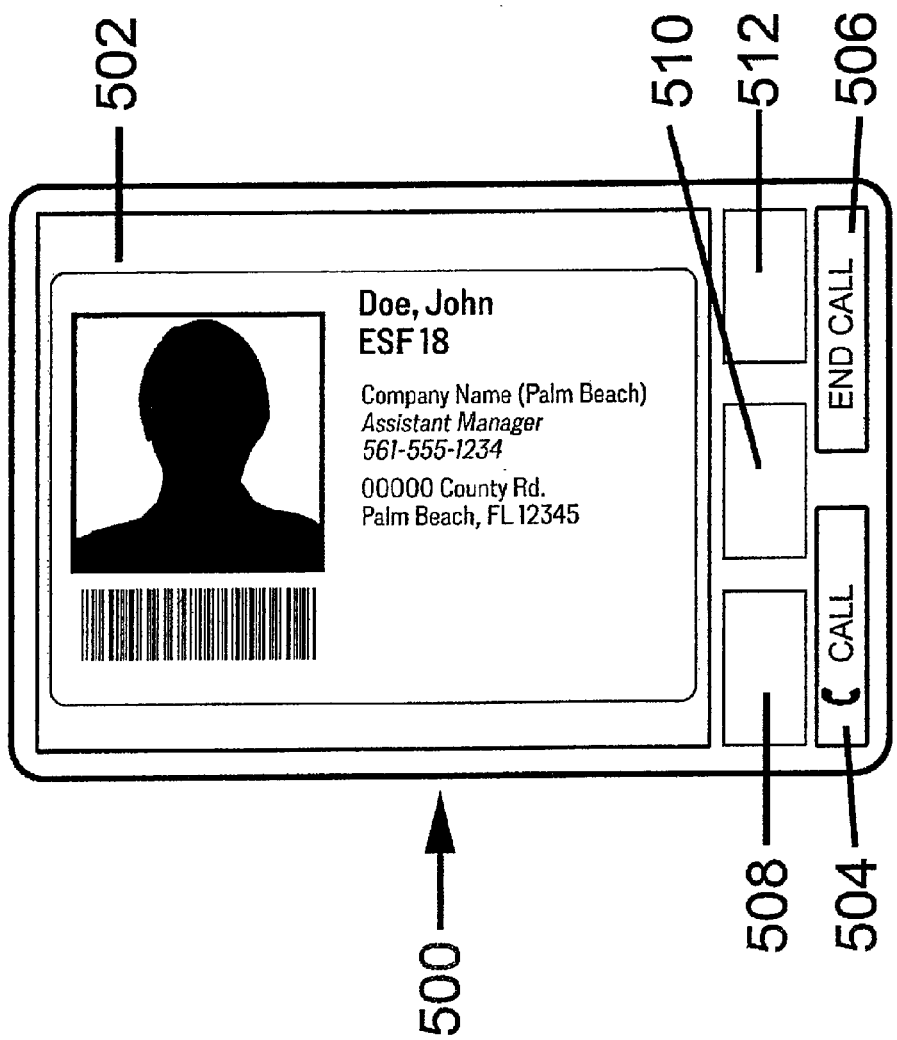
FIG. 20 is an illustrative example of a cell phone with the virtual badge.
Figure 21:
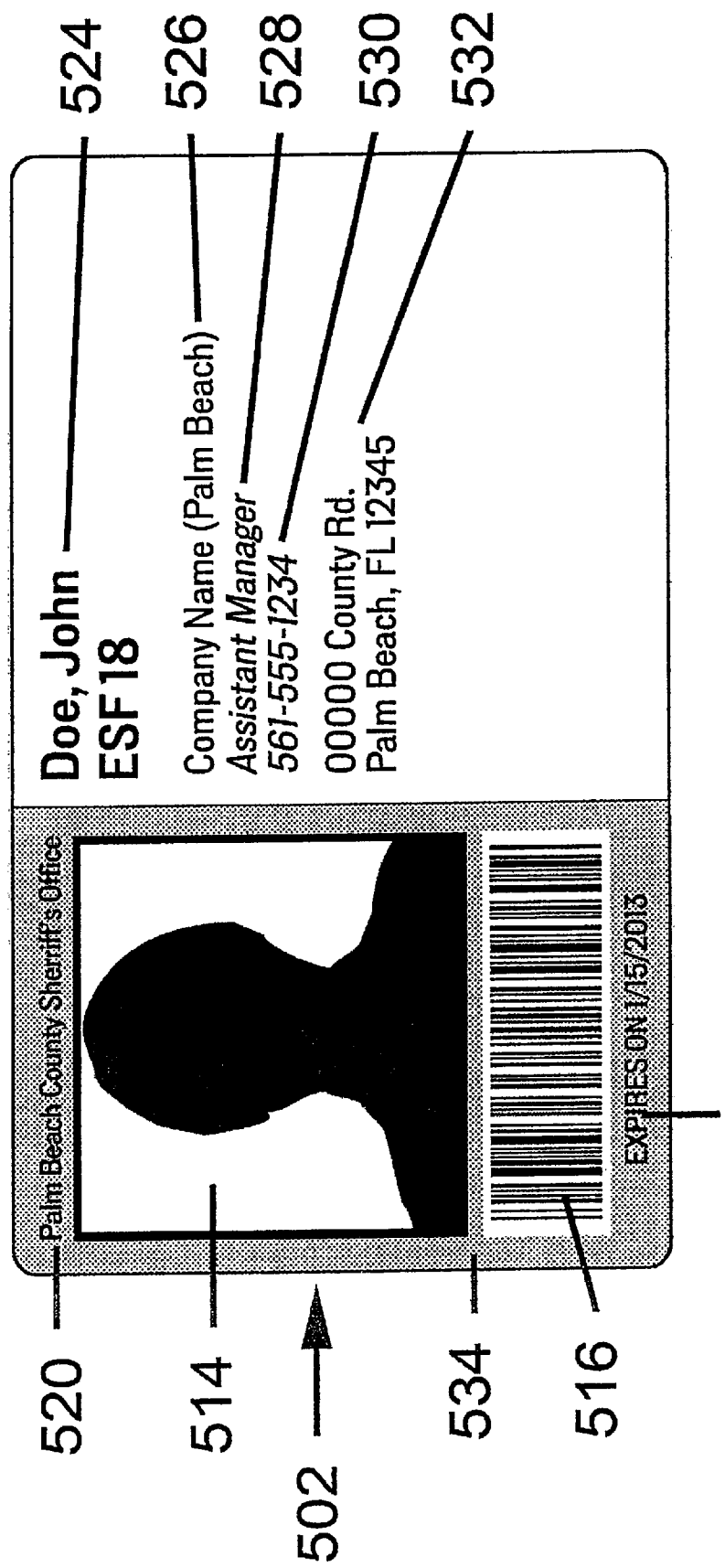
FIG. 21 is an illustrative embodiment of the virtual badge in accordance with the present invention.

FIG. 18 displays a process or method wherein a certain screen or view of the handset application can contain a virtual "badge." The virtual badge may be used for temporary access, such as allowing civilians into a restricted area. The restricted area may be, for example, a business not open to the public, a severely impacted area following a disaster, a large federal facility like an army base, a seaport area, or at any event that requires the use of a badge (including, for another example, a search party looking for a missing child). The virtual badge may be uploaded or downloaded to a separate handset or alternatively may be uploaded/downloaded to an individual's cell phone subject to administrator approval. Referring to FIG. 20, a cell phone 500 with an illustrative embodiment of a virtual badge 502 is shown. The virtual badge may be shown while still allowing the user the capability of using the cell phone, such as making calls 504, ending calls 506, or applications for web-browsing 508, texting 510, or gaming 512. Referring to FIG. 21, an illustrative embodiment of the virtual badge 502 as illustrated in FIG. 20 is shown. The virtual badge in the phone 500, or a handset, can be designed and programmed to be functional by displaying fixed data or data that can be changed, include a variety of information such as an image 514, such as a picture of the individual, a bar code 516 or QR code (provides for additional functionality) which contains the same and/or additional data about the user and which can be scanned for that data on the image via another cell phone with scanning technology or any other scanning technology, such as bar code or QR code readers. This virtual badge concept can be applied to both Smartphones and Feature phones alike. In addition to the photo images, or as part of being Federal Information Processing Standard (FIPS) Compliant, the virtual badge 500 may include details like the badge's issuing agency name 520, expiration date 522, as well as other text based identification, such as name of the individual 524, company identification 526, title 528, and phone number 530. In addition to or if the person with the visual badge is an individual, the address of the location the individual is allowed access to or the address at which the individual resides 532 can be included. Such information is for illustrative purposes only and is not meant to be limiting; whatever other information or FIPS standards may be imposed can be included in the badge.

Referring back to FIG. 18, at Step 398, an Administrator creates or uploads teams, groups, volunteer organizations, and/or local businesses plus their employees (collectively referred to as "a crew") with unique identifiers for each unit. As an illustrative example, for temporary access following a disaster or other emergency or for normal day to day access, Step 398 could be used to upload information relating to a resident (or one of his/her staff members) of a barrier island community or other neighborhood, including the address to which those users are allowed access. Other uses include, but are not limited to providing citizens with temporary access to gated communities or privately restricted areas, monitoring cruise ship passengers entering and exiting the ship, monitoring visitors to public buildings, armed services facilities, volunteers responding to disasters, and/or institutions such as universities or colleges. Step 399 illustrates how each crew uploads its own pre-approved list of users. As an illustrative example, a response crew could upload its crew of users. Alternatively, a homeowner on a barrier island or other neighborhood could perform this Step, if allowed by the Administrator. The upload process would include adequate details of background information to allow proper identification, such as a photo of the user, a name, date of birth, address, and/or social security numbers (enough information for instance of an E-verify background check to confirm the user is a legal resident allowed to work in the United States or for a simple "wants and warrants" check by a local law enforcement agency, all subject to the Administrator's discretion). Step 400 illustrates a mobile user creating an account via a Website seeking a link to a designated crew, or other entity, or the user could receive a push notice via the mobile phone from the Administrator. At Step 401, the Administrator or his designee can perform an E-Verify background check or criminal background check, or other type of check, as may be desired. Step 402 shows the Administrator then needs to approve linking the user to a pre-approved crew and/or homesite and/or business location to allow access to the user's mobile app and merge that user's data with its designated crew, homesite, or business location in the application's database. The Administrator could push the virtual badge to the designated mobile device via the cellular network or via Bluetooth® or other means as needed. At Step 403, the software system then auto-populates a prescribed virtual badge on the mobile device containing user information pertinent to the situation, as illustrated in FIG. 20, such as a photo, logos, a name, social security number, gender, age, skill set, credentials, blood type, etc., along with its unique bar code or QR code image which may contain the same data or more, as determined by the Administrator. This virtual badge may also be color coded, (see FIG. 21 where the shaded 534 region is colored in for example red, blue, yellow, orange), corresponding to any information an administrator, like ESF-16—law enforcement and security, or authorized designee sets. Alternatively, or in addition to the color coded region, other counter measures to counterfeiting such as the use of logos, symbols, or words added to the background and programmed to change based on one or more factors, such as code commands or varying, specified, time periods. At Step 404, the now approved user has an approved virtual badge that can be displayed from his cell phone application. The virtual badge may have multiple screen views on the mobile application, dependent on the information required by the Administrator. For example, the first screen may show various agency logos for identification purposes at a check point. The second screen then might have the photo ID portion of the badge with an image like a bar code. In this way, the virtual badge mimics a two sided, normal badge. The same data may be printed for a real badge to be worn if desired. Alternatively, via Bluetooth® or other wireless technology, the virtual badge on the phone also may be portrayed on a portable, small, lightweight, inexpensive, electronic device or electronic display device having for example a power source, such as a battery pack, and a control unit including a circuit board, such as a printed circuit board and/or a microcontroller. The electronic device also includes the necessary associated circuitry to electrically couple to a display screen, such as an LED screen. The portable electronic device or electronic display device could be worn by the user, hanging from a lanyard, similar to plastic badges. This lightweight electronic badge also could contain an RFID chip for additional tracking features, if the Administrator so desired. Subject to the Administrator's discretion, these color codes on the virtual badge could have built in programming to allow the background colors to change daily, weekly, or monthly to try and help prevent fraud issues, deal with pre-selected expiration deadlines, and improve security clearances. Alternatively, in a connected environment, the Administrator could send a badge the "color of the day" so that check points could be helped to authenticate badges. Likewise, subject to the Administrator's discretion, the virtual badge could be pre-programmed to "self-destruct" or expire by turning all black or somehow making it unreadable or unusable after a day, a week, or a year. These "badges" also may interface with the software system via scanning technology which could compare the image on the badge to data base information to allow verification to ESF-16 or ESF-13 officers (or other guards at check points) so as to allow citizens or responders to access otherwise restricted areas.

Consistent with the rest of this mobile software application, a user with an approved virtual badge on his device, i.e. cell phone, may have the device's history mapped and tracked via the GPS based, mobile application for minutes, hours and/or days, subject to the Administrator's setting. Related to this option, a guard at a check point could turn on the tracking of the user's device via manual or electronic means at the check point for the period when the user is within the restricted area. If the user departs from the restricted area, the guard or Administrator may be alerted and/or the time, location, and the time at the location can be stored for future retrieval. As part of proper exit protocol, i.e. when the individual is no longer in the known restricted area, the guard or administrator would deactivate the tracking software in the same manner it was activated on entry. Using this option for a group of users with badges within the restricted area thus allows, for example, for law enforcement to examine all the users' track histories if there were a burglary within the restricted area to help establish which user may have been near the GPS location of the burglary at the time of the intrusion. With connectivity, the users could be live tracked on base maps while within the restricted area. Even within areas where there are not cell towers or Internet resulting in a completely disconnected environment, the device with the virtual badge could be tracked using the methods described in the rest of this software application and its earlier versions.

The present invention also is a method that allows the uploaded geo-tagged data in the form of photos, forms, events, tasks, and messages to be automatically formatted such that this data can be auto-populated into standardized formats, such as any of the more than 35 standard FEMA ICS forms, such as forms ICS 202, 203, 204, 205, 206, other customized forms, and/or government or business forms. The Administrator can utilize the inputted data either pre-event or during an incident, which data is merged with analytic software within the system to generate a wide variety of reports and/or mapping and graphic displays. This method of inputting data into form fields of pre-existing document templates via the software system so that the form data collected using the GPS enabled cell phone software system auto-populates the forms seamlessly. The form fields may display alpha-numeric tables, maps with GPS located data, graphs, bar charts, sample GPS located photos from the field, and/or narrative information. After the data has been collected electronically and consolidated within the software system, each form field can then be auto-populated, edited, and/or printed to a corresponding paper form (the pre-existing document template).

The present invention also has a process or method that allows for a certain number of "public" geo-tagged posts in the form of photos, forms, events, tasks, and messages to be displayed on the map in the mobile and/or desktop software application within a certain radius of the user's current map-view. The posts are embedded in the user's own or other users' geotagged data, including geolocated photos, within displayed miniature thumbnail photos or icons on the map of said mobile device or the independent storage device, i.e. the base station, laptop server, or cloud server. This technical process shall apply to any zoom-level that the user sets on the map in the mobile and/or desktop software application. These "public" geo-tagged posts may be viewed by any other users of the GPS based cell phone application, but may not be viewed outside of the GPS based cell phone application. Common users of the GPS based cell phone application may rate with a "Like" feature the other users' public posts. In the Whole Community response scenario, Emergency Managers can then quickly identify both the quantity and number of ratings on any user to assign more credibility to reports from previously unknown users. These "public" posts may be exported in a standardized format for potential uses in other software systems and/or in social media like FaceBook, Twitter, or Linked In.

The present invention also involves a process or method that allows for the primary functions of the core mobile and/or desktop software application to be easily adapted for a multitude of uses, including but not limited to: social networking, business fleet-tracking/management, disaster response, post-disaster recovery, mitigation, preparedness, and insurance claims. This technical process is accomplished by adding or subtracting plugin-modules from the code base so as to develop FEMA's "whole community" mentality for responding to disasters by users utilizing the mobile application as a part of their normal daily routine. By using the GPS based cell phone application on a regular daily basis for fun or for business, when an emergency occurs, all of the users are already adept at using the application, rather than needing some new training or refresher to recall how to use the application. The switch from normal daily use to a use designed to immediately upload numerous Situational Awareness reports from the Whole Community re-emphasizes the capacity of using non-governmental responders as force multipliers during a disaster. This collection of technical processes enables the same source code to be customized to fit a multitude of needs. This plug in module design allows for maximum flexibility in adjusting designs to fit the Whole Community, whether for business, school, friends, family, church, or any other applicable group.

Figure 19:
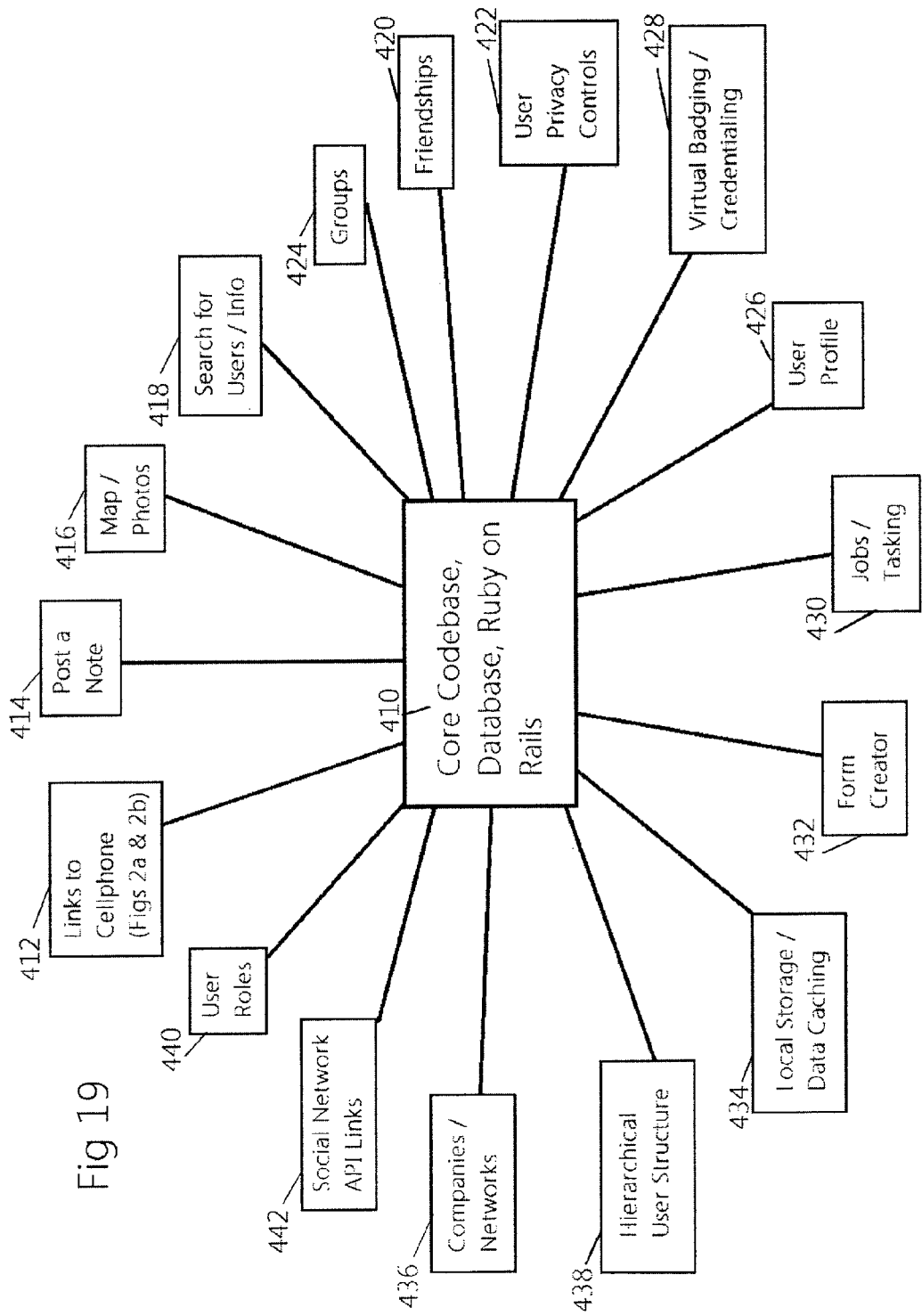
FIG. 19 is a block diagram of the component associated with the functions of FIGS. 17 and 18.

FIG. 19 is a block diagram of the components of the software system processor with a sample of said plug in modules, interacting with the devices of FIG. 1 or 7A-C, by utilizing the hardware illustrated in FIGS. 2A and 2B. The core component of the system is the database or core code base 410. Links to a cell phone are illustrated at 412. A post a note function is illustrated at 414. Maps and photographs can be associated with the data base 410 at 416. A search for users and or other information takes place at 418. Friendships are associated with the database at 420 and user privacy controls which can control access to the friendships take place at 422. Groups are associated with the database 424. A user profile is established at 426. Badging and credentialing is associated with specific users at 428. Jobs and tasks which are required to be performed are associated with the data base at 430. A form creator is associated with the database at 432. Local storage and caching takes place at 434. Companies and networks are connected to the database at 436. A hierarchical user structure for the database is established at 438. User roles are established at 440. Social network API links are provided at 442. All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A method of uploading public data comprising:
    associating a defined land lot location with a global positioning system (GPS) location;
    using said GPS locations to populate a map in a software application with form data fields derived from public data associated with said land lot location;
    associating said public data with said form data fields;
    uploading said merged data into a mobile user's software application;
    allowing a user to make pre-determined or self-created entries in regards to a specific GPS location while at said land lot location;
    assessing various response, recovery, or mitigation needs with said GPS location;
    using said assessments combined with said public data to determine actionable needs assigned to said GPS location;
    associating a color code with said assessment or other needs at said GPS location; and
    displaying said color codes on a map whereby said assessment at a location and/or resources needed to address the specific need or assistance to an area can be determined.

2. The method of claim 1 further including the step of displaying color codes on a map in a mobile user's software application, web-application, or combinations thereof.

3. The method of claim 1 further including the step of transferring the data from said mobile user's software application to an independent data storage device.

4. The method of claim 1 including geotagging and time/date stamping said uploaded data.

5. A method of displaying data on a mobile device comprising:
    providing a mobile device with a software application;
    providing a photo along with administrator prescribed, readable identification data on said mobile device to simulate a government compliant identification badge;
    providing, in addition to a photo and readable identification data, an image on said mobile device, said image being recognized by scanning technology;
    associating data with said image;
    associating a color background with said photo, said readable identification data, or said image which can be timed to change colors after prescribed time periods; and
    said software application enabling verification links to individuals whereby said data can be assessed and/or approved by said individuals.

6. The method of claim 5 further including the step of mapping, tracking and analyzing said data.

7. The method of claim 5 further including the step of associating a pre-programmed, timed, self-destruct or expiration code into the device to render the badge unusable after a prescribed time period established by the administrator.

8. The method of claim 5 further including the step of linking said data to an electronic display device, said device to be worn by a mobile user.

9. A method of populating forms with data comprising:
    associating a location with a global positioning system (GPS) location;
    using a mobile device to populate one or more custom forms within a software application on said mobile device with data or visual information observed at said location;
    associating a global position system (GPS) location with said data or visual information;
    associating a time/date stamp with said data or visual information,
    assessing at least one response, recovery, or mitigation need at said location;
    using said assessments or said data or visual information to determine actionable needs assigned to said location; and
    associating a color code with said assessment or said data or visual information at said location; and
    transferring said data or visual information from said mobile device to an independent data storage device.

10. The method of claim 9 including collecting said data electronically; and
    editing and/or analyzing said data, including merging or assigning certain form fields to display a response to other form fields within the data.

11. The method of claim 10 including printing said forms on paper.

12. The method of claim 5 further comprising the step of:
    embedding the user's own or other users' geotagged data, including geolocated photos, within displayed photos or icons on a map on said mobile device.

13. The method of claim 12 further including displaying geotagged data on a map of a software application in an independent mobile device or data storage device.

14. The method of claim 13 wherein said geotagged data resides within a displayed icon or photo on said map and can be retrieved by said administrator or user.

\* \* \* \* \*